(12) United States Patent
Lei

(10) Patent No.: US 11,767,181 B2
(45) Date of Patent: Sep. 26, 2023

(54) ROBOTIC SYSTEM WITH HANDLING MECHANISM AND METHOD OF OPERATION THEREOF

(71) Applicant: Mujin, Inc., Tokyo (JP)

(72) Inventor: Lei Lei, Tokyo (JP)

(73) Assignee: Mujin, Inc., Tokyo (JP)

( * ) Notice: Subject to any disclaimer, the term of this patent is extended or adjusted under 35 U.S.C. 154(b) by 542 days.

(21) Appl. No.: 16/701,798

(22) Filed: Dec. 3, 2019

(65) Prior Publication Data

US 2020/0290825 A1    Sep. 17, 2020

Related U.S. Application Data

(60) Provisional application No. 62/818,399, filed on Mar. 14, 2019.

(51) Int. Cl.
*B65G 61/00* (2006.01)
*G05B 19/4093* (2006.01)
(Continued)

(52) U.S. Cl.
CPC ............ *B65G 61/00* (2013.01); *B25J 9/1664* (2013.01); *B25J 9/1697* (2013.01);
(Continued)

(58) Field of Classification Search
CPC ....... B65G 61/00; B25J 9/1664; B25J 9/1697; B25J 15/0616; G05B 19/40935;
(Continued)

(56) References Cited

U.S. PATENT DOCUMENTS 4,735,452 A * 4/1988 Nemoto ............... B25J 15/0273
414/730
9,457,480 B2   10/2016 Usami
(Continued)

FOREIGN PATENT DOCUMENTS

JP    S62282884 A    12/1987
JP    H04343691 A *  11/1992 ............. B25J 13/08
(Continued)

*Primary Examiner* — Khoi H Tran
*Assistant Examiner* — Tristan J Greiner
(74) *Attorney, Agent, or Firm* — Perspectives Law Group, Corp.

(57) ABSTRACT

A gripper including: an orientation sensor configured to generate an orientation reading for a target object; a first grasping blade and a second grasping blade configured to secure the target object in conjunction with the first grasping blade and at an opposite end of the target object relative to the first grasping blade; a first position sensor, of the first grasping blade, configured to generate a first position reading of the first grasping blade relative to the target object; a second position sensor, of the second grasping blade, configured to generate a second position reading of the second grasping blade relative to the target object; and a blade actuator configured to secure the target object with the first grasping blade and the second grasping blade based on a valid orientation of the orientation reading and based on the first position reading and the second position reading indicating a stable condition.

20 Claims, 10 Drawing Sheets

(51) Int. Cl.
*B25J 9/16* (2006.01)
*B25J 15/06* (2006.01)
*G06Q 10/087* (2023.01)

(52) U.S. Cl.
CPC .... *B25J 15/0616* (2013.01); *G05B 19/40935* (2013.01); *G06Q 10/087* (2013.01); *G05B 2219/40053* (2013.01); *G05B 2219/40607* (2013.01)

(58) Field of Classification Search
CPC .......... G05B 2219/40053; G05B 2219/40607; G06Q 10/087
See application file for complete search history.

(56) References Cited

U.S. PATENT DOCUMENTS

| | | | |
|---|---|---|---|
| 10,350,755 B2 | 7/2019 | Wagner et al. | |
| 2005/0046213 A1* | 3/2005 | Geddo | G21C 19/32 |
| | | | 294/95 |
| 2015/0336280 A1* | 11/2015 | Usami | H01L 21/67733 |
| | | | 294/67.33 |
| 2017/0225330 A1 | 8/2017 | Wagner et al. | |
| 2018/0292803 A1* | 10/2018 | Kurek | G05B 19/401 |
| 2019/0099891 A1* | 4/2019 | Tomioka | B25J 9/1697 |
| 2019/0321971 A1* | 10/2019 | Bosworth | B25J 9/1065 |
| 2019/0351549 A1* | 11/2019 | Suzuki | B25J 9/1697 |

FOREIGN PATENT DOCUMENTS

| | | | |
|---|---|---|---|
| JP | H04343691 A | 11/1992 | |
| JP | 2015222738 A | 12/2015 | |

* cited by examiner

ROBOTIC SYSTEM WITH HANDLING MECHANISM AND METHOD OF OPERATION THEREOF

CROSS-REFERENCE TO RELATED APPLICATION

This application claims the benefit of U.S. Provisional Patent Application Ser. No. 62/818,399 filed Mar. 14, 2019, and the subject matter thereof is incorporated herein by reference thereto.

TECHNICAL FIELD

The present technology is directed generally to robotic systems and, more specifically, to handling mechanism.

BACKGROUND

Modern robotics and automation are providing increasing levels of functionality to support in industrial settings, such as manufacturing facilities, receiving and distribution centers, and warehouses. Research and development in the existing technologies can take a myriad of different directions.

As users become more empowered with the growth of robotic systems, new and old paradigms begin to take advantage of this new technology space. There are many technological solutions to take advantage of these new capabilities to enhance or augment automation of robotic systems, such as the capability for the robotic systems to autonomously handle various objects. However, users are not provided the option rely on the robotic systems to accurately and efficiently identify objects from a collection of objects in a consistent manner.

Thus, a need still remains for a robotics system with a handling mechanism that is configurable. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a gripper including: an orientation sensor configured to generate an orientation reading for a target object; a first grasping blade configured to secure the target object; a second grasping blade configured to secure the target object in conjunction with the first grasping blade and at an opposite end of the target object relative to the first grasping blade; a first position sensor configured to generate a first position reading of the first grasping blade relative to the target object and located with the first grasping blade; a second position sensor configured to generate a second position reading of the second grasping blade relative to the target object and located with the second grasping blade; and a blade actuator configured to secure the target object with the first grasping blade and the second grasping blade based on a valid orientation of the orientation reading and based on the first position reading and the second position reading indicating a stable condition, and coupled to the first grasping blade and the second grasping blade.

An embodiment of the present invention provides a method of operation of a robotic system including a gripper further including: generating an orientation reading for a target object; generating a first position reading representing a position of a first grasping blade of the gripper relative to the target object; generating a second position reading representing a position of a second grasping blade of the gripper relative to the target object and the second grasping blade located at an opposite side of the target object as the first grasping blade, and executing an instruction for securing the target object with the first grasping blade and the second grasping blade based on a valid orientation reading of the orientation reading and based on the first position reading and the second position reading indicating a stable condition.

An embodiment of the present invention provides a robotic system, including: a control unit configured to: verify a valid orientation for a target object, determine a stable condition for the target object based on a first position reading of a first grasping blade of a gripper relative to the target object and a second position reading of a second grasping blade of the gripper relative to the target object, generate a chuck command based on the stable condition and the valid orientation for the target object; and a communication unit, coupled to the control unit, configured to: transmit the chuck command for securing the target object with the first grasping blade and the second grasping blade.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
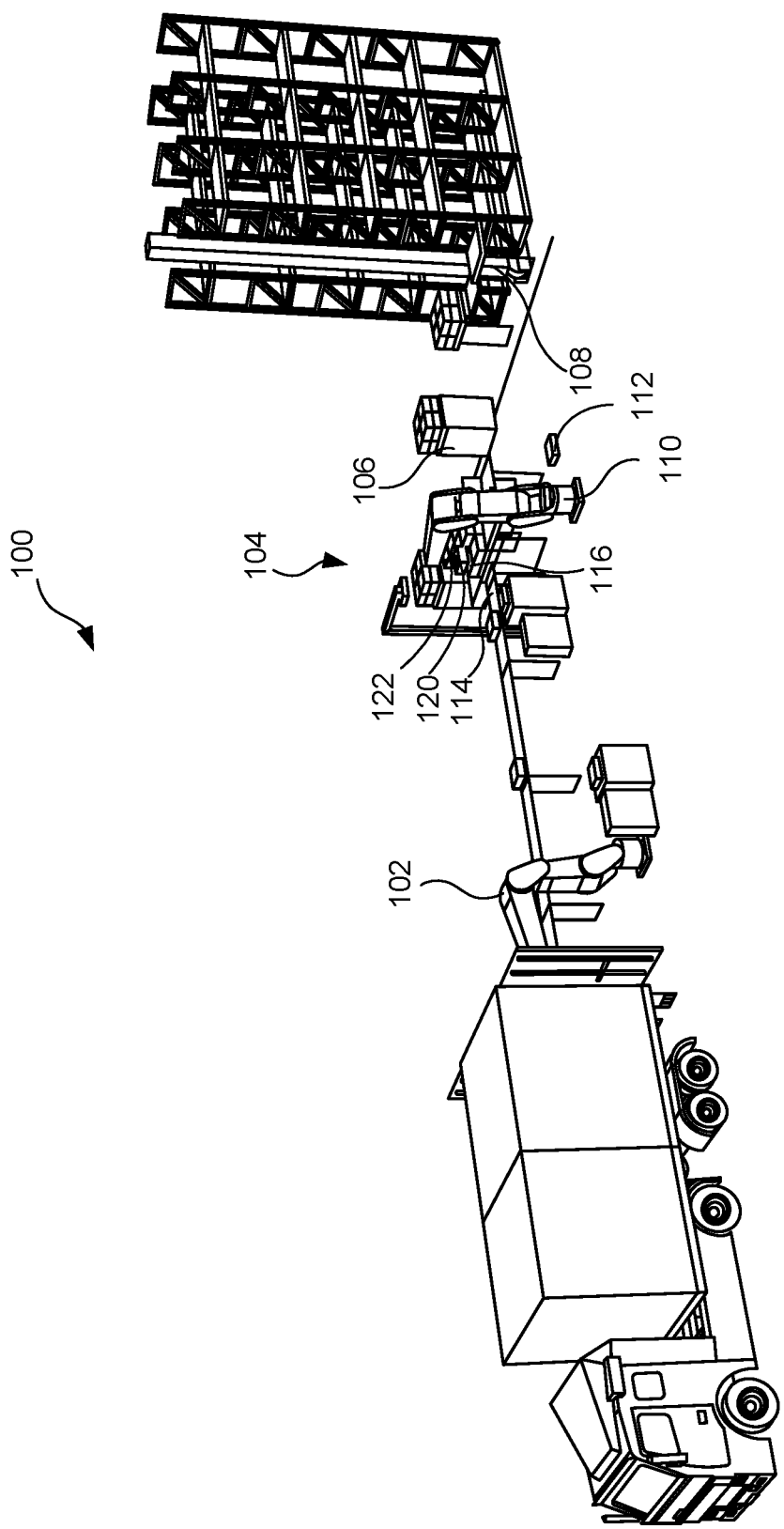
FIG. 1 is an example environment for a robotic system with a handling mechanism in an embodiment.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. The appearances of such phrases in this specification do not necessarily all refer to the same embodiment. On the other hand, such references are not necessarily mutually exclusive. Furthermore, the particular features, structures, materials, or characteristics can be combined in any suitable manner in one or more embodiments.

It is to be understood that the various embodiments shown in the figures are merely illustrative representations. Further, the drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

The term "module" or "unit" referred to herein can include software, hardware, mechanical mechanisms, or a combination thereof in an embodiment of the present invention, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof. Furthermore, the mechanical mechanism can include actuators, motors, arms, joints, handles, end effectors, guides, mirrors, anchoring bases, vacuum lines, vacuum generators, liquid source lines, or stoppers. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units.

Referring now to FIG. 1, therein is shown an example environment for a robotic system 100 with a handling mechanism in an embodiment. The environment for the robotic system 100 can includes one or more structures, such as robots or robotic devices, configured to execute one or more tasks. Aspects of the object handling mechanism can be practiced or implemented by the various structures.

In the example illustrated in FIG. 1, the robotic system 100 can include an unloading unit 102, a transfer unit 104, a transport unit 106, a loading unit 108, a robotic unit 110, a controller 112, or a combination thereof in a warehouse, a distribution center, or a shipping hub. The robotic system 100 or a portion of the robotic system 100 can be configured to execute one or more tasks.

The tasks can be combined in sequence to perform an operation that achieves a goal, for example, such as to unload a target object 120 from a vehicle, such as a truck, trailer, a van, or train car, for storage in a warehouse or to unload the target object 120 from storage locations and load the target object 120 onto a vehicle for shipping. The tasks are functions performed or executed by the robotic system 100 for the physical transformation upon the unloading unit 102, the transfer unit 104, the transport unit 106, the loading unit 108, the robotic unit 110, or a combination thereof.

For example, the task can include moving the target object 120 from one location, such as a container, bin, cage, basket, shelf, platform, pallet, or conveyor belt, to another location. The robotic system 100 or a portion of the robotic system 100 can be configured to execute a sequence of actions, such as operating one or more components therein, to execute a task.

The target object 120 can represent one or more containers to be displaced or moved by the robotic system 100. An example of the target object 120 can include bins, boxes, crates, enclosures, packages, or a combination thereof. The target object 120 will be further described later.

FIG. 1 illustrates examples of the possible functions and operations that can be performed by the various units of the robotic system 100 in handling the target object 120 and it is understood that the environment and conditions can differ from those described hereinafter. For example, the unloading unit 102 can be a vehicle offloading robot configured to transfer the target object 120 from a location in a carrier, such as a truck, to a location on a conveyor belt.

Also, the transfer unit 104, such as a palletizing robot, can be configured to transfer the target object 120 from a location on the conveyor belt to a location on the transport unit 106, such as for loading the target object 120 on a pallet on the transport unit 106. In another example, the transfer unit 104 can be a piece-picking robot configured to transfer the target object 120. In completing the operation, the transport unit 106 can transfer the target object 120 from an area associated with the transfer unit 104 to an area associated with the loading unit 108, and the loading unit 108 can transfer the target object 120, such as by moving the pallet carrying the target object 120, from the transfer unit 104 to a storage location, such as a location on the shelves.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The controller 112 can provide the intelligence for the robotic system 100 or a portion of the robotic system 100 to perform the tasks. As an example, the controller 112 can control the operations of the robotic unit 110 to move the target object 120.

For illustrative purposes, the robotic system 100 is described with separate components, such as the robotic unit 110 and the controller 112, although it is understood that the robotic system 100 can be organized differently. For example, the robotic system 100 can include the functions provided by the controller 112 distributed throughout the robotic system 100 and not as a separate enclosure as shown in FIG. 1. Also for example, the controller 112 can be included as a portion of the robotic unit 110. Further for example, the controller 112 can be multiple enclosure each providing intelligences to different portions or units of the robotic system 100.

Returning to the robotic unit 110, the robotic unit 110 can include a gripper 122. The robotic unit 110 can utilize the gripper 122 to move the target object 120 in the transfer unit 104. As described earlier, the controller 112 can provide the intelligences for the robotic unit 110. Similarly, the controller 112 can also provide the intelligence for the gripper 122.

As an example, the intelligence from the controller 112 can be distributed with the robotic unit 110. As a specific example, the gripper 122 can also provide some intelligence for the operation of the gripper 122 and can interact with the intelligence from the controller 112 or the distributed intelligence as part of the robotic unit 110.

Figure 2:
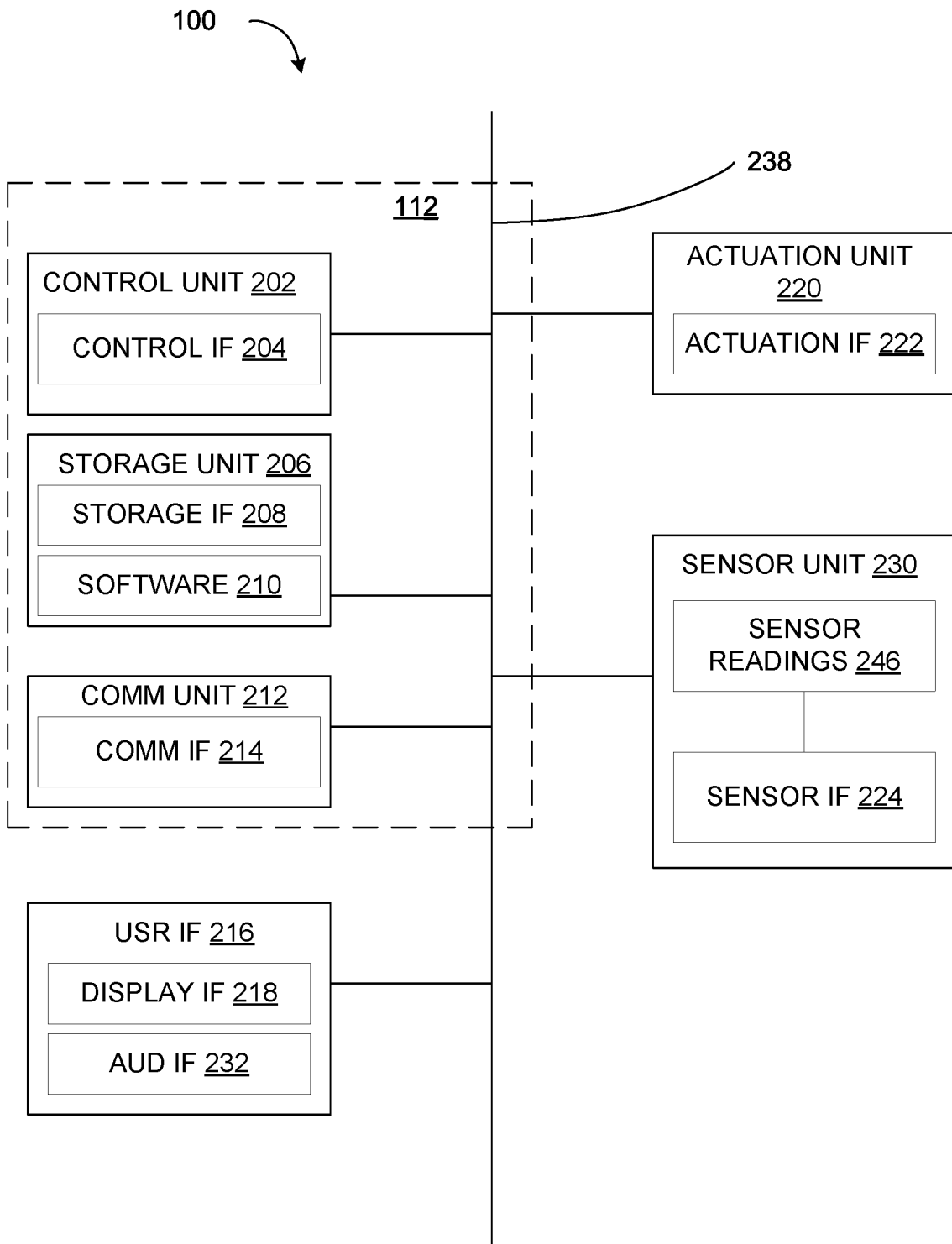
FIG. 2 is an example of a block diagram of the robotic system.

Referring now to FIG. 2, therein is shown an example of a block diagram of the robotic system 100. The example shown in FIG. 2 can be for the robotic system 100 shown in FIG. 1. In one embodiment, the robotic system 100 can include a control unit 202, a storage unit 206, a communication unit 212, a user interface 216, an actuation unit 220, and a sensor unit 230. In one embodiment, one or more of these components can be combined in the controller 112 as depicted by a dashed box.

The controller 112 can house a portion of the robotic system 100. For example, the controller 112 can be a case, a chassis, a box, a console, a computer tower, or a computer motherboard. Continuing with the example, the control unit 202, the storage unit 206, the communication unit 212, or a combination thereof can be housed and included in the controller 112. Also for example, the control unit 202, the storage unit 206, the communication unit 212, or a combination thereof can be housed and included in the controller 112 while the user interface 216, can be accessible external to the controller 112.

While one or more portions of the robotic system 100 can be housed in or on the controller 112, other portions of the robotic system 100 can be external to the controller 112. For example, the user interface 216, the actuation unit 220, the sensor unit 230, or a combination thereof can be external to the controller 112 while the control unit 202, the storage unit 206, and the communication unit 212, are housed and included in the controller 112. Other combinations of portions of the robotic system 100 or the robotic unit 110 of FIG. 1 can be housed in the controller 112.

The control unit 202 can execute a software 210 to provide the intelligence of the robotic system 100. The control unit 202 can also execute the software 210 for the other functions of the robotic system 100. The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof.

For illustrative purposes, the control unit 202 is shown as a single element, although it is understood that the control unit 202 can represent a number of devices and a distribution of compute resources. For example, the control unit 202 can be a distribution of compute resources throughout and external to the robotic system 100. Also for example, the control unit 202 can be distributed between the controller 112, the robotic unit 110, the gripper 122 of FIG. 1, or a combination thereof. The software 210 can also be distributed between the controller 112, the robotic unit 110, the gripper 122, or a combination thereof.

The control unit 202 can include a control interface 204. The control interface 204 can be used for communication between the control unit 202 and other functional units of the robotic system 100. The control interface 204 can also be used for communication that is external to the robotic system 100. The control interface 204 can receive information from the other functional units or from external sources, or can transmit information to the other functional units or to external destinations. The external sources and the external destinations refer to sources and destinations external to the robotic system 100.

The control interface 204 can be implemented in different ways and can include different implementations depending on which functional units or external units are being interfaced with the control interface 204. For example, the control interface 204 can be implemented with a pressure sensor, an inertial sensor, a microelectromechanical system (MEMS), optical circuitry, waveguides, wireless circuitry, wireline circuitry, an application programming interface, or a combination thereof.

The storage unit 206 can store the software 210. For illustrative purposes, the storage unit 206 is shown as a single element, although it is understood that the storage unit 206 can represent a number of devices and a distribution of storage elements. Also for illustrative purposes, the robotic system 100 is shown with the storage unit 206 as a single hierarchy storage system, although it is understood that the robotic system 100 can have the storage unit 206 in a different configuration. For example, the storage unit 206 can be formed with different storage technologies forming a memory hierarchal system including different levels of caching, main memory, rotating media, or off-line storage. Also for example, the storage unit 206 can be distributed between the controller 112, the robotic unit 110, the gripper 122, or a combination thereof. The software 210 can also be distributed between the controller 112, the robotic unit 110, the gripper 122, or a combination thereof.

The storage unit 206 can be a volatile memory, a nonvolatile memory, an internal memory, an external memory, or a combination thereof. For example, the storage unit 206 can be a nonvolatile storage such as non-volatile random access memory (NVRAM), Flash memory, disk storage, or a volatile storage such as static random access memory (SRAM).

The storage unit 206 can include a storage interface 208. The storage interface 208 can be used for communication between the storage unit 206 and other functional units of the robotic system 100. The storage interface 208 can also be used for communication external to the robotic system 100. The storage interface 208 can receive information from the other functional units of the robotic system 100 or from external sources, or can transmit information to the other functional units of the robotic system 100 or to external destinations. The external sources and the external destinations refer to sources and destinations external to the robotic system 100.

The storage interface 208 can include different implementations depending on which functional units or external units are being interfaced with the storage unit 206. The storage interface 208 can be implemented with technologies and techniques similar to the implementation of the control interface 204.

The communication unit 212 can enable communication to and from the robotic system 100, including communication between portions of the robotic system 100, external devices, or a combination thereof. For example, the communication unit 212 can permit the robotic system 100 to communicate with an external device, such as an external computer, an external database, an external machine, an external peripheral device, or a combination thereof through a communication path 238.

The communication path 238 can span and represent a variety of networks and network topologies. For example, the communication path 238 can include wireless communication, wired communication, optical communication, ultrasonic communication, or the combination thereof. For example, satellite communication, cellular communication, Bluetooth, Infrared Data Association standard (lrDA), wireless fidelity (WiFi), and worldwide interoperability for microwave access (WiMAX) are examples of wireless communication that can be included in the communication path 238. Cable, Ethernet, digital subscriber line (DSL), fiber optic lines, fiber to the home (FTTH), and plain old telephone service (POTS) are examples of wired communication that can be included in the communication path 238.

Further, the communication path 238 can traverse a number of network topologies and distances. For example, the communication path 238 can include direct connection, personal area network (PAN), local area network (LAN), metropolitan area network (MAN), wide area network (WAN), or a combination thereof. The control unit 202 can further execute the software 210 for interaction with the communication path 238 via the communication unit 212.

The communication unit 212 can also function as a communication hub allowing the robotic system 100 to function as part of the communication path 238 and not be limited to be an end point or terminal unit to the communication path 238. The communication unit 212 can include active and passive components, such as microelectronics or an antenna, for interaction with the communication path 238.

The communication unit 212 can include a communication interface 214. The communication interface 214 can be used for communication between the communication unit 212 and other functional units of the robotic system 100. The communication interface 214 can receive information from the other functional units of the robotic system 100 or from external sources, or can transmit information to the other functional units of the robotic system 100 or to external destinations. The communication interface 214 can include different implementations depending on which functional units are being interfaced with the communication unit 212. The communication interface 214 can be implemented with technologies and techniques similar to the implementation of the control interface 204.

The control unit 202 can operate the user interface 216 to present or receive information generated by the robotic system 100. The user interface 216 can include an input device and an output device. Examples of the input device of the user interface 216 can include a keypad, a touchpad, soft-keys, a keyboard, a microphone, sensors for receiving remote signals, a camera for receiving motion commands, or any combination thereof to provide data and communication inputs. Examples of the output device can include a display interface 218 and an audio interface 232.

The display interface 218 can be any graphical user interface such as a display, a projector, a video screen, or any combination thereof. The audio interface 232 can include speakers, microphones, headphones, subwoofers, sound components, transducers, or any combination thereof. The display interface 218 and the audio interface 232 allow a user of the robotic system 100 to interact with the robotic system 100. The display interface 218 and the audio interface 232 can be optional.

The robotic system 100 can also include the actuation unit 220. The actuation unit 220 can include devices, for example, motors, springs, gears, pulleys, chains, rails, wires, artificial muscles, electroactive polymers, or a combination thereof, configured to drive, manipulate, displace, orient, re-orient, or a combination thereof, the structural members or mechanical components of the robotic system 100 about or at a corresponding mechanical joint. The control unit 202 can operate the actuation unit 220, to control or manipulate the actuation unit 220.

For illustrative purposes, the actuation unit 220 is shown as a single element, although it is understood that the actuation unit 220 can represent a number of devices and be a distribution of actuators. For example, the actuation unit 220 can be distributed throughout the robotic system 100. Also for example, the actuation unit 220 can be distributed throughout the robotic unit 110, the gripper 122, or a combination thereof.

The actuation unit 220 can include an actuation interface 222. The actuation interface 222 can be used for communication between the actuation unit 220 and other functional units of the robotic system 100, the robotic unit 110, the gripper 122, or a combination thereof. The actuation interface 222 can also be used for communication that is external to the robotic system 100. The actuation interface 222 can receive information from the other functional units of the robotic system 100 or from external sources, or can transmit information to the other functional units or to external destinations. The actuation interface 222 can function as a source for the actuation process, such as gas lines.

The actuation interface 222 can include different implementations depending on which functional units of the robotic system 100 or external units are being interfaced with the actuation unit 220. The actuation interface 222 can be implemented with technologies and techniques similar to the implementation of the control interface 204. The actuation interface 222 can also be implemented with pneumatic or gas devices.

The robotic system 100 can include the sensor unit 230 configured to obtain sensor readings 246 used to execute the tasks and operations, such as for manipulating the structural members of the robotic system 100, the robotic unit 110, the gripper 122, or a combination thereof. The sensor unit 230 can also be configured to obtain the sensor readings 246 for portions of the robotic system 100. For example, the sensor unit 230 can obtain the sensor readings 246 for the robotic unit 110, the gripper 122, or a combination thereof. Also for example, the sensor unit 230 can obtain the sensor readings 246 for items operated upon by the robotic system 100, the robotic unit 110, the gripper 122, or a combination thereof. As a specific example, the sensor unit 230 can object sensor readings 246 for the target object 120 of FIG. 1.

The sensor readings 246 can include information or data from the sensor unit 230 to detect events or changes in the environment of the robotic system 100 and to send the information to portions of the robotic system 100, external devices, or a combination thereof to facilitate the tasks. Examples for the sensor readings 246 can include image readings, optical readings, pressure reading, distance reading, or a combination thereof.

For illustrative purposes, the sensor unit 230 is shown as a single element, although it is understood that the sensor unit 230 can represent a number of devices. For example, the actuation unit 220 can be distributed throughout the robotic system 100. Also for example, the actuation unit 220 can be distributed throughout the robotic unit 110, the gripper 122, or a combination thereof.

The sensor unit 230 can include a sensor interface 224. The sensor interface 224 can be used for communication between the sensor unit 230 and other portions of the robotic system 100. The sensor interface 224 can also be used for communication that is external to the robotic system 100. The sensor interface 224 can receive information from the other portions of the robotic system 100 or from external sources, or can transmit information to the other portions of the robotic system 100 or to external destinations. As a specific example, the sensor interface 224 can provide communication with and between the robotic unit 110, the gripper 122, or a combination thereof as well as with the other portions of the robotic system 100.

The sensor interface 224 can include different implementations depending on which functional units of the robotic system 100 or external units are being interfaced with the sensor unit 230. The sensor interface 224 can be implemented with technologies and techniques similar to the implementation of the control interface 204.

Figure 3:
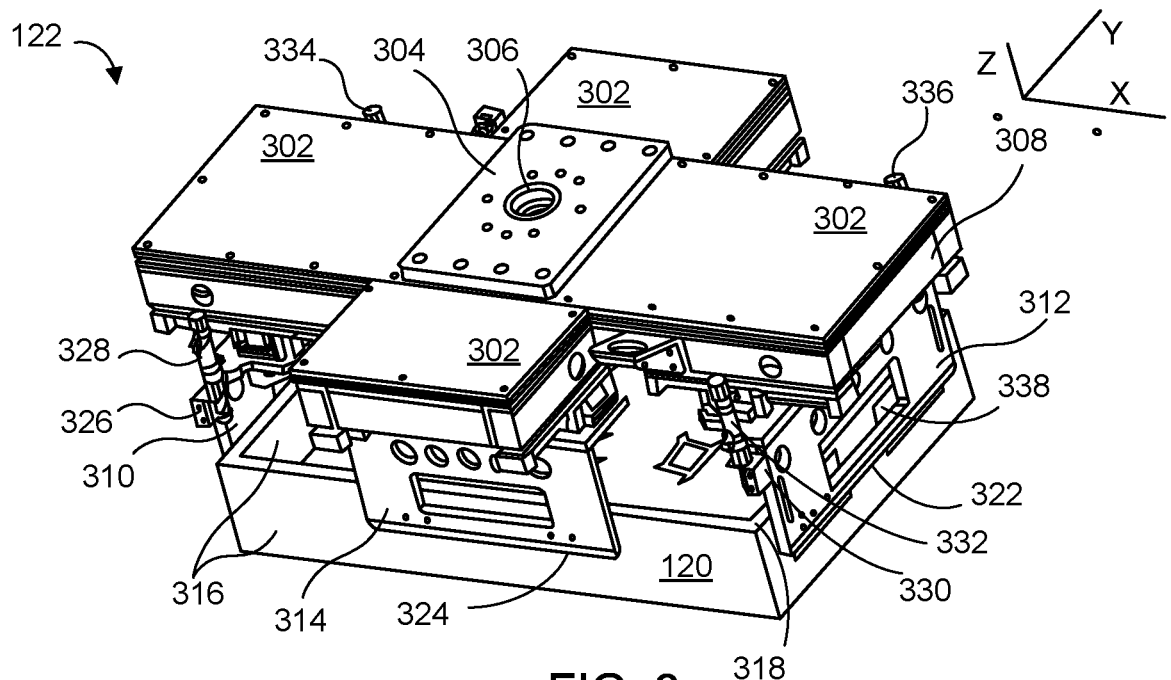
FIG. 3 is a top perspective view of an example of the gripper with the target object in an embodiment.

Referring now to FIG. 3, therein is shown a top perspective view of an example of the gripper 122 with the target object 120 in an embodiment of the robotic system 100 of FIG. 1. The gripper 122 and the target object 120 can represent instances of the target object 120 as shown in FIG. 1.

The gripper 122 provides the handling and grasping mechanism of the robotic system 100, or as a specific example the robotic unit 110 of FIG. 1. The robotic system 100 can also utilize the gripper 122 or different configurations of the gripper 122 in other portions of the robotic system 100, such as the unloading unit 102 of FIG. 1.

In this example, this view of the gripper 122 is shown with covers 302 and a mounting plate 304. The covers 302 assist in enclosing the internals of the gripper 122. The mounting plate 304 provides an attachment mechanism to the robotic system 100, or as a specific example the robotic unit 110. The mounting plate 304 can include a mounting hole 306 at a central region of the mounting plate 304 for an attachment with the robotic system 100, or as a specific example the robotic unit 110.

In this example, the covers 302 are shown with two sets of pair of the covers 302 at opposite sides of the mounting plate 304. Each of the pair of the covers 302 are located in a perpendicular configuration to the other pair. The mounting plate 304 is located in a central region between the covers 302.

For clarity of reference, the x-axis refers to the direction along the longest side of the covers 302 as shown in FIG. 3 and along the same side of the gripper 122. The y-axis refers to the direction along the shorter side of the covers 302 as shown in FIG. 3. The y-axis also refers to the direction perpendicular to the x-axis. Both the x-axis and the y-axis are along the same plane as the covers. The z-axis refers to the direction perpendicular to both the x-axis and the y-axis. As an example, the origin of the x-axis, the y-axis, and the z-axis can be at the center of the mounting hole 306. The origin refers to the zero value for the x-axis, the y-axis, and the z-axis or where these axes intersect.

The term "horizontal" is defined hereinafter as the plane parallel to the x-y plane. The term "vertical" is defined hereinafter as the plane perpendicular to the horizontal.

As an example, the gripper 122 can also include a frame 308. The frame 308 provides the structure rigidity and grasping limitations for the gripper 122. The mounting plate 304, the covers 302, or a combination thereof can be attached to the frame 308. The frame 308 can be formed from a single structure or can be formed from segmented portion that are attached together.

Continuing with the description of the gripper 122, the gripper 122 is shown in FIG. 3 to include a first grasping blade 310, a second grasping blade 312, and a third grasping blade 314. The first grasping blade 310, the second grasping blade 312, the third grasping blade 314, or a combination thereof can be used to secure the target object 120. The target object 120 includes walls 316 along the vertical axis. The walls 316 can include an object top 318, which are along the horizontal axis.

In this example, the first grasping blade 310 and the second grasping blade 312 are shown at opposite ends of the gripper 122. The first grasping blade 310 and the second grasping blade 312 are shown parallel to each other. Also in this example, the third grasping blade 314 is shown at a side of the gripper 122 perpendicular to the sides where the first grasping blade 310 and the second grasping blade 312 are configured.

Also, the first grasping blade 310 along a line parallel to the y-axis can extend beyond the frame 308 along the y-axis. The second grasping blade 312 along a line parallel to the y-axis can extend beyond the frame 308 along a line parallel to the y-axis. In other words, the first grasping blade 310 and the second grasping blade 312 can be wider than the width of the frame 308 in that, along the line parallel to the y-axis, the lateral extent of the first grasping blade 310 and the lateral extent of the second grasping blade 312 can extend beyond the lateral extent of the frame 308. Similarly, the third grasping blade 314 along a line parallel to the x-axis can extend beyond the frame 308 along a line parallel to the x-axis. In other words, the third grasping blade 314 can be wider than the width of the frame 308 in that, along the line parallel to the x-axis, the lateral extent of the third grasping blade 308 can extend beyond the lateral extent of the frame 308. However, it is understood that the first grasping blade 312, the second grasping blade 312, the third grasping blade 314, or a combination thereof can be in different configurations such that the respective widths are less than the width of the frame 308 along the respective y-axis and x-axis.

The second grasping blade 312 includes a second blade bottom 322. The second blade bottom 322 is at a side of the second grasping blade 312 located away from the frame 308. Similarly, the third grasping blade 314 includes a third blade bottom 324. The third blade bottom 324 is at a side of the third blade bottom 324 located away from the frame 308.

The example in FIG. 3 also depicts the first grasping blade 310 including a first sensor bracket 326. The first sensor bracket 326 is along a first vertical side of the first grasping blade 310. The first sensor bracket 326 provides a mounting mechanism for a first actuator 328 to be attached to the first grasping blade 310 at that location. The first actuator 328 can help secure the target object 120 by pressing on the object top 318.

FIG. 3 also depicts the second grasping blade 312 including a second sensor bracket 330. The second sensor bracket 330 is along a second vertical side of the second grasping blade 312. The second sensor bracket 330 provides a mounting mechanism for a second actuator 332 to be attached to the second grasping blade 312 at that location. The second actuator 332 can help secure the target object 120 by pressing on the object top 318.

In this example shown, the first sensor bracket 326 and the second sensor bracket 330 are at opposite ends of the gripper 122. Similarly, the first actuator 328 and the second actuator 332 are at opposite vertical ends of the gripper 122.

As a further example, the first actuator 328 can optionally adjust the location of some of the sensor unit 230 of FIG. 2 located at the first grasping blade 310. The second actuator 332 can optionally adjust the location of some of the sensor unit 230 of FIG. 2 located at the second grasping blade 312. The first actuator 328, the second actuator 332, and the sensor unit 230 will be further described later.

The perspective view shown in FIG. 3 also depicts a third actuator 334 and a fourth actuator 336. In this example, the third actuator 334 has a similar function as the first actuator 328. Also for example, the third actuator 334 is located at the opposite end of the first grasping blade 310 as the first actuator 328 along a line parallel to the y-axis.

Also in this example, the fourth actuator 336 has a similar function as the second actuator 332. Also for example, the fourth actuator 336 is located at the opposite vertical end of the second grasping blade 312 as the second actuator 332.

Now moving to the description to the target object 120, FIG. 3 depicts the gripper 122 over the target object 120. Also shown in FIG. 3 is the first grasping blade 310, the second grasping blade 312, and the third grasping blade 314 next to the walls 316.

In this example, the walls 316 are parallel in a vertical configuration. The walls 316 provide grasping structures for the gripper 122 to secure the target object 120. Each or some of the walls 316 can include indents 338 to assist in securing the target object 120 with the gripper 122, or as a specific example the first grasping blade 310, the second grasping blade 312, the third grasping blade 314, or a combination thereof. The indents 338 are recessed portions of or openings in the walls 316. The gripper 122 and the use of the indents 338 will be further described later.

Figure 4:
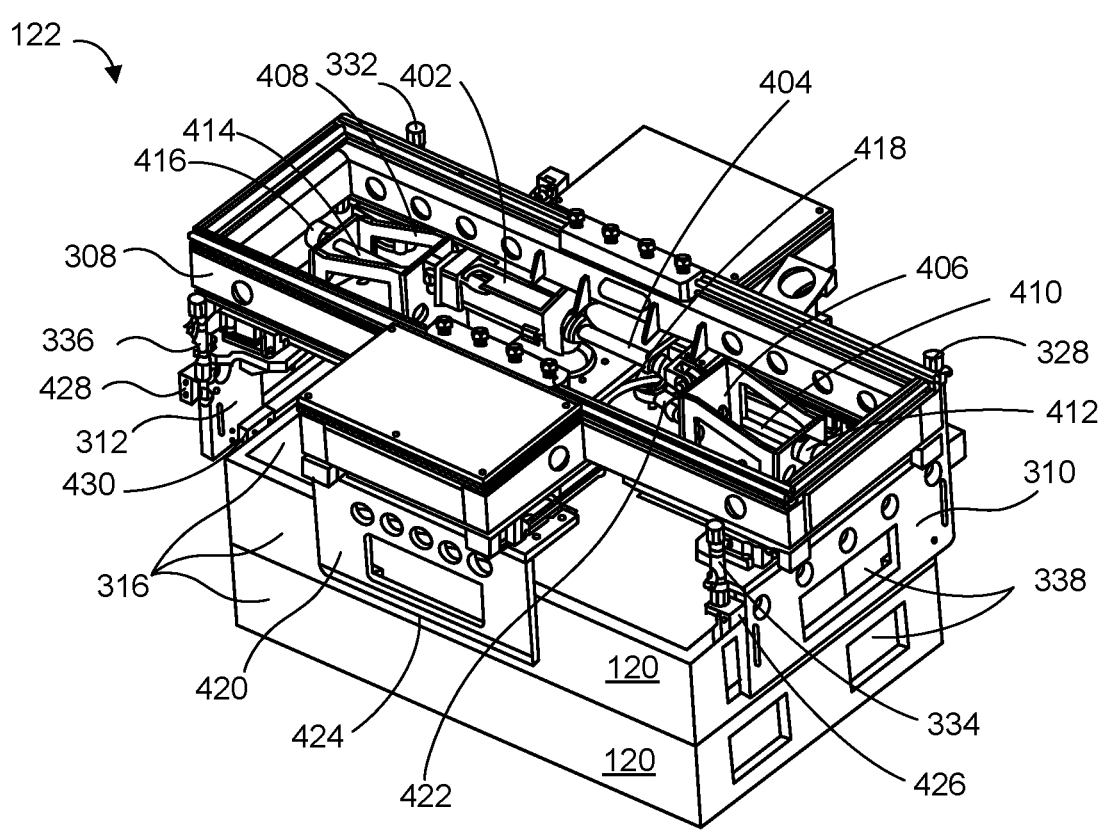
FIG. 4 is a top perspective view exposing a portion of an interior of the gripper.

Referring now to FIG. 4, therein is shown a top perspective view exposing a portion of an interior of the gripper 122. The gripper 122 can represent the example shown in FIG. 3 but rotated approximately 180 degrees along the z-axis as shown in FIG. 3.

In this example, the exposed interior depicts a blade actuator 402. The blade actuator 402 provides linear displacement based on the movement of a displacement rod 404 attached at one end of the blade actuator 402 and the corresponding displacement of the blade actuator 402 at the other end.

Along one end of the blade actuator 402, the blade actuator 402 is attached to the displacement rod 404, which is connected to a first transfer bracket 406. At the opposite end, the blade actuator 402 is attached to a second transfer bracket 408.

The first transfer bracket 406 is used to impart the displacement from the blade actuator 402. As an example, the blade actuator 402 can cause movement to the displacement rod 404 and imparting that movement with the first transfer bracket 406 to the first grasping blade 310. In this example, the first transfer bracket 406 can be connected to a horizontal portion of the first grasping blade 310.

The second transfer bracket 408 is also used to impart the displacement from the blade actuator 402. As an example, the blade actuator 402 can cause movement to the second transfer bracket 408 in an opposite direction to the first transfer bracket 406. In this example, the second transfer bracket 408 can be connected to a horizontal portion of the second grasping blade 312.

The first transfer bracket 406 can be connected to a first blade limiter 410. The first blade limiter 410 bounds the extent to which the first grasping blade 310 can extend along the direction parallel to the x-axis and along the direction away from the second grasping blade 312.

As an example, the first blade limiter 410 can be a screw or an extendable rod. In this example, the first blade limiter 410 can include a first stopper 412 facing the frame 308. The location of the first stopper 412 can be adjusted by the screw or extendable rod position of the first blade limiter 410 relative to the first transfer bracket 406. The first stopper 412 limits the movement of the first transfer bracket 406, the first grasping blade 310, or a combination thereof when the first stopper 412 makes contact with the interior of the frame 308.

The second transfer bracket 408 can be connected to a second blade limiter 414. The second blade limiter 414 bounds the extent to which the second grasping blade 312 can extend along the direction parallel to the x-axis and along the direction away from the first grasping blade 310.

As an example, the second blade limiter 414 can be a screw or an extendable rod. In this example, the second blade limiter 414 can include a second stopper 416 facing the frame 308. The location of the second stopper 416 can be adjusted by the screw or extendable rod position of the second blade limiter 414 relative to the second transfer bracket 408. The second stopper 416 limits the movement of the second transfer bracket 408, the second grasping blade 312, or a combination thereof when the second stopper 416 makes contact with the interior of the frame 308.

For illustrative purposes, the gripper 122 is described with the blade actuator 402 configured with the displacement rod 404 connected to the first transfer bracket 406, although it is understood that the gripper 122 can be configured differently. For example, the blade actuator 402 can connect to the first transfer bracket 406 without the displacement rod 404 or the displacement rod 404 being optional. Also for example, the blade actuator 402 can have the displacement rod 404 connected to the second transfer bracket 408, which is in turn connected to the second grasping blade 312.

Continuing the displacement description, the gripper 122 can include an actuation wheel 418 for imparting the displacement of the first grasping blade 310, the second grasping blade 312, or a combination thereof to the third grasping blade 314 of FIG. 3, a fourth grasping blade 420, or a combination thereof. In this example, a first wheel rod 422 connects the horizontal portion of the first grasping blade 310 to the actuation wheel 418. The first wheel rod 422 transfers the displacement to and from the actuation wheel 418. The actuation wheel 418 and the transfer to displacement will be further described later.

Now describing a different portion of the gripper 122, the fourth grasping blade 420 is shown at a side of the gripper 122 perpendicular to the sides where the first grasping blade 310 and the second grasping blade 312 are configured. The fourth grasping blade 420 includes a fourth blade bottom 424. The fourth blade bottom 424 is at a side located away from the frame 308.

The example in FIG. 4 also depicts the first grasping blade 310 including a third sensor bracket 426. The third sensor bracket 426 is along a vertical side of the first grasping blade 310 and located at an opposite side where the first sensor bracket 326 of FIG. 3 is located. The third sensor bracket 426 provides a mounting mechanism for the third actuator 334 to be attached to the first grasping blade 310 at that location.

FIG. 4 also depicts the second grasping blade 312 including a fourth sensor bracket 428. The fourth sensor bracket 428 is along a vertical side of the second grasping blade 312 and located at an opposite side where the second sensor bracket 330 of FIG. 3 is located. The fourth sensor bracket 428 provides a mounting mechanism for the fourth actuator 336 to be attached to the second grasping blade 312 at that location.

In this example shown, the third sensor bracket 426 and the fourth sensor bracket 428 are at opposite ends of the gripper 122 along a line parallel to the x-axis. Similarly, the third actuator 334 and the fourth actuator 336 are at opposite ends of the gripper 122 along a line parallel to the x-axis.

As a further example, the third actuator 334 can optionally adjust the location of some of the sensor unit 230 of FIG. 2 located at the first grasping blade 310. The fourth actuator 336 can optionally adjust the location of some of the sensor unit 230 of FIG. 2 located at the second grasping blade 312. The third actuator 334, the fourth actuator 336, and the sensor unit 230 of FIG. 2 will be further described later.

The perspective view shown in FIG. 3 also depicts the first actuator 328 and the second actuator 332. The example shown in FIG. 4 depicts a number of the target object 120 stacked on top of another. In this example, the gripper 122 is shown not yet securing any of the target object 120.

FIG. 4 also depicts protrusions 430 on the second grasping blade 312 and the fourth grasping blade 420. The protrusions 430 are physical features for the gripper 122 to secure and assist lifting the target object 120. The protrusions 430 can be placed or located to fit into the indents 338 along the walls 316 of the target object 120. The protrusions 430 can also be placed or located proximate to regions of the walls 316 without one of the indents 338.

For example, the protrusions 430 can be integral to the second grasping blade 312 as well as the fourth grasping blade 420. Also for example, the protrusions 430 can separate from and attached to the second grasping blade 312 as well as the fourth grasping blade 420.

The perspective view of FIG. 4 depicts one of the protrusions 430 on the second grasping blade 312 and another one on the fourth grasping blade 420. However, the second grasping blade 312 can include more than one of the protrusions 430. Similarly, the fourth grasping blade 420 can also include more than one of the protrusions 430. Further, the first grasping blade 310 can also include one or more of the protrusions 430, although not shown in FIG. 4. Similarly, the third grasping blade 314 can also include one or more of the protrusions 430, although not shown in FIG. 4.

In this example, the first grasping blade 310 and the second grasping blade 312 are shown to be at the same level as the fourth grasping blade 420 to secure the target object 120. Similarly in the example shown in FIG. 3, the first grasping blade 310 and the second grasping blade 312 at the same level as the third grasping blade 314 to secure the target object 120.

For illustrative purposes, the gripper 122 is shown to be configured with the first grasping blade 310, the second grasping blade 312, the third grasping blade 314 of FIG. 3, and the fourth grasping blade 420 at the same level to secure the target object 120, although it is understood that the gripper 122 can be configured differently. For example, the first grasping blade 310, the second grasping blade 312, the third grasping blade 314, and the fourth grasping blade 420 can each be at a different level depending on the configuration, weight distribution, height, or a combination thereof of the target object 120. Also for example, the some of the first grasping blade 310, the second grasping blade 312, the third grasping blade 314, the fourth grasping blade 420, or a combination thereof can be at the same level while the others being at a different level.

Also for illustrative purposes, the gripper 122 is shown with the first grasping blade 310, the second grasping blade 312, the third grasping blade 314, and the fourth grasping blade 420 at the same level to secure the target object 120, although it is understood that the gripper 122 can be configured differently. For example, the first grasping blade 310 and the second grasping blade 312 can be at the same level to secure the target object 120 in the stack. Continuing with the same example, the third grasping blade 314 and the fourth grasping blade 420 can be at the same level but different from the first grasping blade 310 and the second grasping blade 312 to secure a different instance of the target object 120 in the stack.

Figure 5:
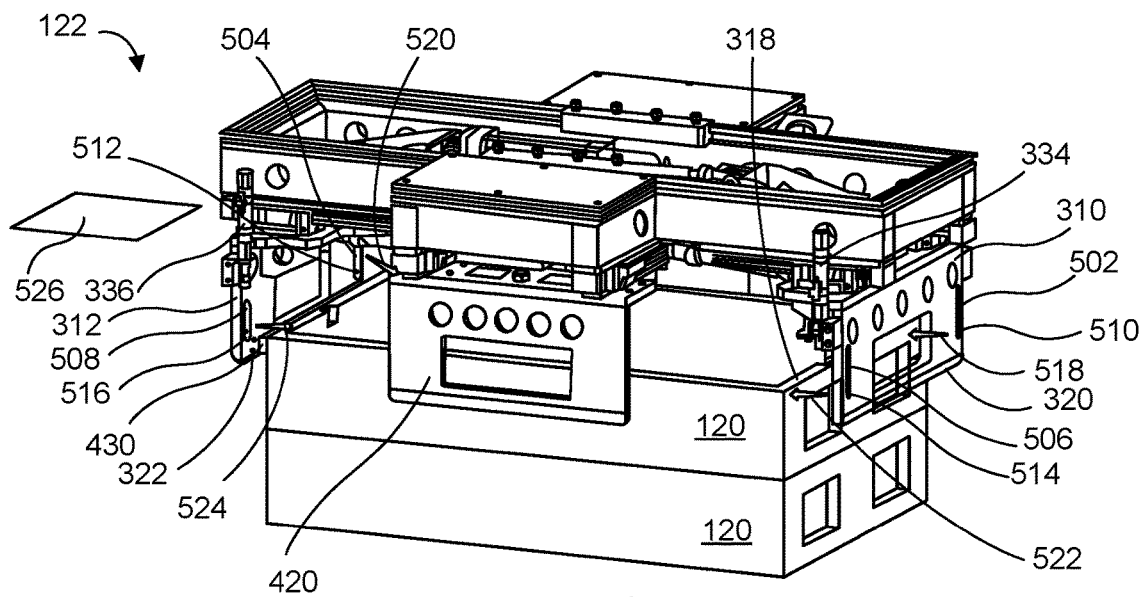
FIG. 5 is a top perspective view of the gripper positioning with the target object.

Referring now to FIG. 5, therein is shown a top perspective view of the gripper 122 positioning with the target object 120. The example shown in FIG. 5 can represent the gripper 122 of FIG. 4 but in a different angle for the perspective view.

In this example, the first grasping blade 310 and the second grasping blade 312 include a first slot 502 and a second slot 504, respectively. The first slot 502 is located along and proximate a vertical side. The second slot 504 is located along and proximate a vertical side. As a specific example, the first slot 502 and the second slot 504 can be located facing each other or along a horizontal line.

Continuing with the example, the first grasping blade 310 and the second grasping blade 312 can also include a third slot 506 and a fourth slot 508, respectively. The third slot 506 is located along and proximate a vertical side. The fourth slot 508 is located along and proximate a vertical side. As a specific example, the third slot 506 and the fourth slot 508 can be located facing each other or along a horizontal line.

The first grasping blade 310 and the second grasping blade 312 can include the sensor unit 230 of FIG. 2 located in the first slot 502, the second slot 504, the third slot 506, the fourth slot 508, or a combination thereof. As previously discussed, the sensor unit 230 can provide or generate the sensor readings 246 of FIG. 2.

As a specific example, the sensor unit 230 can include a first position sensor 510, a second position sensor 512, a third position sensor 514, a fourth position sensor 516, or a combination thereof. Also as a specific example, the sensor readings 246 can include a first position reading 518, a second position reading 520, a third position reading 522, a fourth position reading 524, or a combination thereof.

The first position sensor 510 can provide location information of the first grasping blade 310 relative to the target object 120 to the robotic system 100 of FIG. 1, or as a specific example to the robotic unit 110 of FIG. 1, the controller 112 of FIG. 1, or a combination thereof. As a specific example, the first position sensor 510 can provide location information of the first blade bottom 320 relative to the object top 318 of the target object 120.

As a specific example, the first position sensor 510 can be an optical sensor and can generate the first position reading 518. The first position reading 518 can indicate that the first position sensor 510 has detected that the first position sensor 510 is below the object top 318.

The second position sensor 512 can provide location information of the second grasping blade 312 relative to the target object 120 to the robotic system 100, or as a specific example to the robotic unit 110, the controller 112, or a combination thereof. As a specific example, the second position sensor 512 can provide location information of the second blade bottom 322 relative to the object top 318 of the target object 120.

As a specific example, the second position sensor 512 can be an optical sensor and can generate the second position reading 520. The second position reading 520 can indicate that the second position sensor 512 has detected that the second position sensor 512 is below the object top 318.

The third position sensor 514 can provide location information of the first grasping blade 310 relative to the target object 120 to the robotic system 100, or as a specific example to the robotic unit 110, the controller 112, or a combination thereof. As a specific example, the third position sensor 514 can provide location information of the first blade bottom 320 relative to the object top 318 of the target object 120.

As a specific example, the third position sensor 514 can be an optical sensor and can generate the third position reading 522. The third position reading 522 can indicate that the third position sensor 514 has detected that the third position sensor 514 is below the object top 318.

The fourth position sensor 516 can provide location information of the second grasping blade 312 relative to the target object 120 to the robotic system 100, or as a specific example to the robotic unit 110, the controller 112, or a combination thereof. As a specific example, the fourth position sensor 516 can provide location information of the second blade bottom 322 relative to the object top 318 of the target object 120.

As a specific example, the fourth position sensor 516 can be an optical sensor and can generate the fourth position reading 524. The fourth position reading 524 can indicate that the fourth position sensor 516 has detected that the fourth position sensor 516 is below the object top 318.

As an example, the first position sensor 510 can be located within the first slot 502 to achieve the predetermined distance between the first blade bottom 320 and the object top 318. Similarly, the third position sensor 514 can be located within the third slot 506 to achieve the predetermined distance between the first blade bottom 320 and the object top 318.

Also for example, the second position sensor 512 can be located within the second slot 504 to achieve the predetermined distance between the second blade bottom 322 and the object top 318. Similarly, the fourth position sensor 516 can be located within the fourth slot 508 to achieve the predetermined distance between the second blade bottom 322 and the object top 318.

As a more specific example, the first position sensor 510 can operate with the second position sensor 512 to determine if both are below the object top 318. In other words, the first position sensor 510 and the second position sensor 512 can operate such that one is generating an optical beam while the other is receiving the optical beam. While this optical beam is not broken, the first position reading 518, the second position reading 520, or a combination thereof can indicate that the first position sensor 510, the second position sensor 512, or a combination thereof are above the object top 318. When the optical beam is broken, the first position reading 518, the second position reading 520, or a combination thereof can indicate that the first position sensor 510, the second position sensor 512, or a combination thereof are below the object top 318.

Similarly as a more specific example, the third position sensor 514 can operate with the fourth position sensor 516 to determine if both are below the object top 318. In other words, the third position sensor 514 and the fourth position sensor 516 can operate such that one is generating an optical beam while the other is receiving the optical beam. While this optical beam is not broken, the third position reading 522, the fourth position reading 524, or a combination thereof can indicate that the third position sensor 514, the fourth position sensor 516, or a combination thereof are above the object top 318. When the optical beam is broken, the third position reading 522, the fourth position reading 524, or a combination thereof can indicate that the third position sensor 514, the fourth position sensor 516, or a combination thereof are below the object top 318.

In this example, the gripper 122 is shown as not securing or not having grasped onto the target object 120. As an example, the robotic system 100, or as a specific example the robotic unit 110, the controller 112, or a combination thereof, can lower the gripper 122 such that the first position reading 518, the second position reading 520, the third position reading 522, the fourth position reading 524, or a combination thereof can contribute to an indication of a stable condition 526 depicted in FIG. 5 as a planar rhomboid to represent planarity for stability.

The stable condition 526 reflects the location of the gripper 122 relative to the target object 120 to be grasped and perhaps moved. As an example, the stable condition 526 can be based on the first position reading 518 working in conjunction with the second position reading 520. As a specific example, the stable condition 526 can be negated or lost when an optical beam is broken at different times between the first position sensor 510 and the second position sensor 512 as indicated by the first position reading 518, the second position reading 520, or a combination thereof.

The timing and tolerance of when the optical beam is broken to determine the stable condition 526 or not can vary based on a number of factors. For example, the speed in which the gripper 122 is lowered towards the target object 120 can determine a range of time where being within the range of time in which the optical beam is broken can be determined as the stable condition 526 while being outside of the range of time can be determined as not in the stable condition 526. Also for example, the mechanical rigidity along the horizontal plane of the gripper 122 being held by the robotic unit 110 of FIG. 1 can also provide a tolerance specification for the range of time similarly as described above.

As a further example, the stable condition 526 can be based the third position reading 522 working in conjunction with the fourth position reading 524. As a specific example, the stable condition 526 can be negated or lost when an optical beam is broken at different times between the third position sensor 514 and the fourth position sensor 516 as indicated by the third position reading 522, the fourth position reading 524, or a combination thereof.

As yet a further example, the stable condition 526 can be based the first position reading 518 working in conjunction with the second position reading 520 as well as the third position reading 522 working in conjunction with the fourth position reading 524. As a specific example, the stable condition 526 can be negated or lost when both optical beams are broken at different times between the first position sensor 510 and the second position sensor 512 as well as between the third position sensor 514 and the fourth position sensor 516.

Also for example, the first position sensor 510, the second position sensor 512, the third position sensor 514, the fourth position sensor 516, or a combination thereof can also provide a range sensing function. In this example, the first position reading 518, the second position reading 520, the third position reading 522, the fourth position reading 524, or a combination thereof can provide distance information from the target object 120, the walls 316 of FIG. 3, the indents 338 of FIG. 8, or a combination thereof. The range sensing function can allow the robotic system 100, the controller 112 of FIG. 1, the gripper 122, or a combination thereof to control the distance for the actuation of the first grasping blade 310 of FIG. 3, the second grasping blade 312 of FIG. 3, the third grasping blade 314 of FIG. 3, the fourth grasping blade 420 of FIG. 4, or a combination thereof to secure the target object 120.

As a further example, the first actuator 328 of FIG. 3 can optionally adjust the location of the first position sensor 510 within the first slot 502 to achieve the predetermined distance between the first blade bottom 320 and the object top 318. As a specific example, the first actuator 328 can adjust the first position sensor 510 up or down within the first slot 502 to accommodate different dimensions of the object top 318 relative to the indents 338 as well as the first blade bottom 320.

Similarly, the third actuator 334 can optionally adjust the location of the third position sensor 514 within the third slot 506 to achieve the predetermined distance between the first blade bottom 320 and the object top 318. As a specific example, the third actuator 334 can adjust the third position sensor 514 up or down within the third slot 506 to accommodate different dimensions of the object top 318 relative to the indents 338 as well as the first blade bottom 320.

Continuing with the further example, the second actuator 332 of FIG. 3 can optionally adjust the location of the second position sensor 512 within the second slot 504 to achieve the predetermined distance between the second blade bottom 322 and the object top 318. As a specific example, the second actuator 332 can adjust the second position sensor 512 up or down within the second slot 504 to accommodate different dimensions of the object top 318 relative to the indents 338 as well as the second blade bottom 322.

Similarly, the fourth actuator 336 can optionally adjust the location of the fourth position sensor 516 within the fourth slot 508 to achieve the predetermined distance between the second blade bottom 322 and the object top 318. As a specific example, the fourth actuator 336 can adjust the fourth position sensor 516 up or down within the fourth slot 508 to accommodate different dimensions of the object top 318 relative to the indents 338 as well as the second blade bottom 322.

For illustrative purposes, the gripper 122 is described with a configuration with the first position sensor 510 and the third position sensor 514 attached to the first grasping blade 310 while the second position sensor 512 and the fourth position sensor 516 are attached to the second grasping blade 312, although it is understood that the gripper 122 can be configured differently. For example, the gripper 122 can be configured with one of the aforementioned position sensors to be attached to the first grasping blade 310 and the second grasping blade 312 at the central region thereof as opposed to proximate to the edges. Also for example, the gripper 122 can be configured with the third grasping blade 314 of FIG. 3 and the fourth grasping blade 420 to also have one or more of the aforementioned position sensors attached thereto and not just the first grasping blade 310 and the second grasping blade 312.

It has been discovered that the gripper 122, the robotic unit 110 of FIG. 1, the controller 112 of FIG. 1, the robotic system 100 of FIG. 1, or a combination thereof can provide improved accuracy for secure grasping of the target object 120 with minimal space requirements. The first grasping blade 310 and the second grasping blade 312 include slots for the first position sensor 510 and the third position sensor 514, and the second position sensor 512 and the fourth position sensor 516, respectively. The use of the slots eliminates the need for separate physical space for the position sensors beyond what is already required and used for the first grasping blade 310 and the second grasping blade 312. The first position sensor 510 and the third position sensor 514 working in conjunction with the second position sensor 512 and the fourth position sensor 516, respectively, can ensure that the grasping blades and the protrusions 430 are located in the correct locations before the gripper 122 closes or chucks. The first position reading 518, the second position reading 520, the third position reading 522, the fourth position reading 524, or a combination thereof from the first position sensor 510, the second position sensor 512, the third position sensor 514, and the fourth position sensor 516, relatively, can be used to determine the stable condition 526 for the gripper 122 to secure the target object 120.

Figure 6:
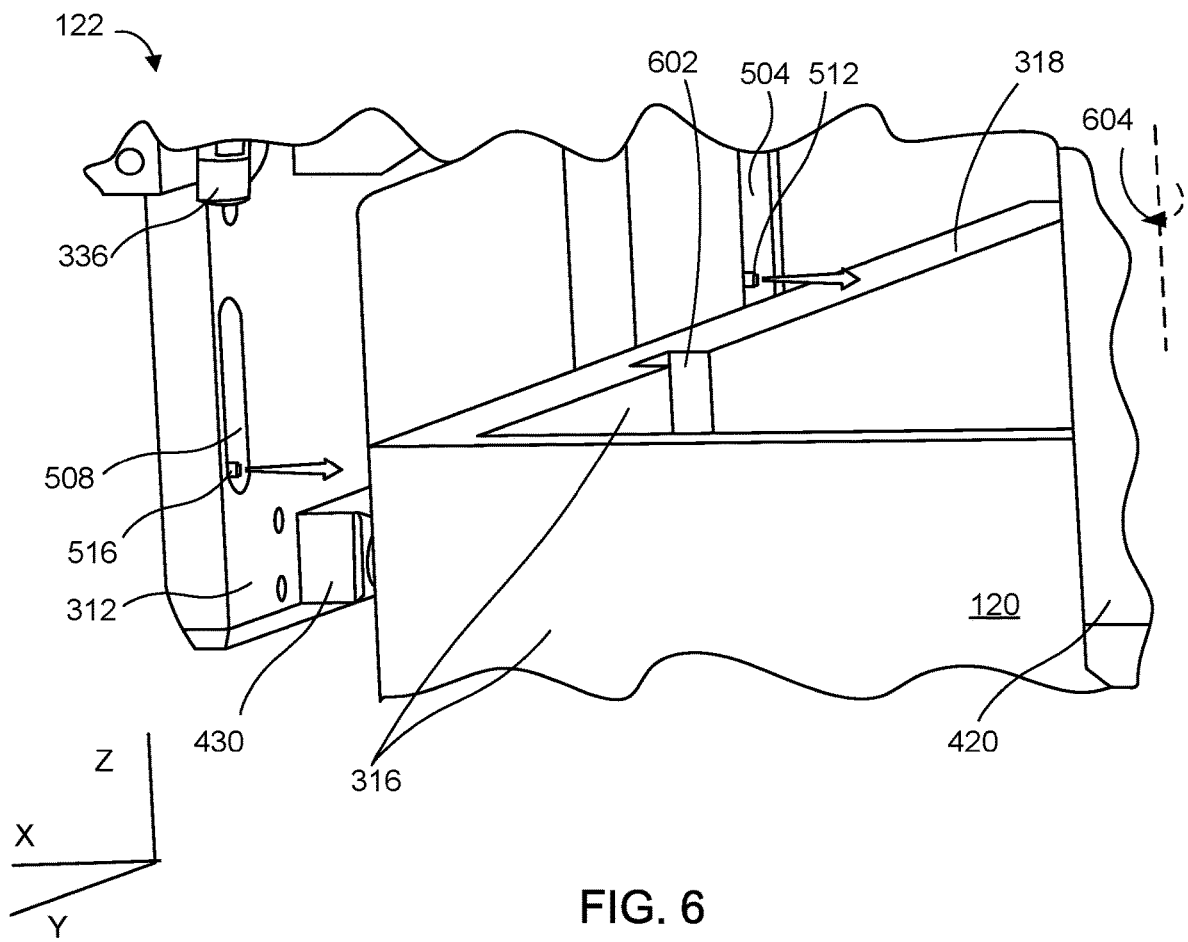
FIG. 6 is a detailed view of a portion of the gripper of positioning with the target object.

Referring now to FIG. 6, therein is shown a detailed view of a portion of the gripper 122 of FIG. 5 positioning with the target object 120. In this example, the detailed view depicts the second grasping blade 312 and the fourth grasping blade 420. The second grasping blade 312 is shown with the second slot 504 and the fourth slot 508.

In this example, the second slot 504 and the fourth slot 508 are proximate to the opposite vertical sides of the second grasping blade 312. The fourth slot 508 is shown extending vertically allowing for the adjustment of the height or location of the fourth position sensor 516, which can be performed manually or by the fourth actuator 336. The second slot 504 is also shown extending vertically allowing for the adjustment of the height or location of the second position sensor 512, which can be performed manually or by the second actuator 332 of FIG. 4.

FIG. 6 depicts the one of the protrusions 430 extending from the second grasping blade 312. In this example, the protrusions 430 do not block the fourth slot 508 or other slots. Also, the protrusions 430 do not impede the functions of the fourth position sensor 516 or the other position sensors. As a specific example, the protrusions 430 are below the locations of the fourth position sensor 516 as well as the other position sensors.

In this example, the fourth position sensor 516 and the second position sensor 512 are positioned at about the object top 318. At this position of the gripper 122 relative to the target object 120, the protrusions 430 are below the object top 318 allowing the gripper 122 to secure the target object 120 with the protrusions 430 contacting the walls 316.

FIG. 6 also depicts one of the walls 316 including an orientation feature 602. The orientation feature 602 is a structural characteristic or configuration of the target object 120 indicating the placement or rotation along the horizontal plane. While the first position sensor 510 of FIG. 5, the second position sensor 512, the third position sensor 514 of FIG. 5, the fourth position sensor 516, or a combination thereof aides with the gripper 122, the robotic unit 110 of FIG. 1, the controller 112 of FIG. 1, the robotic system 100 of FIG. 2, or a combination thereof to determine the stable condition 526 of FIG. 5 based on the vertical position, the orientation feature 602 allows the gripper 122, the robotic unit 110, the controller 112, the robotic system 100, or a combination thereof to determine a valid orientation 604 along the horizontal plane. The valid orientation 604 is depicted in FIG. 6 as a rotation orientation around a line parallel to the z-axis.

The valid orientation 604 allows the determination that the target object 120 is in the correct horizontal placement, horizontal rotation, or a combination thereof to ensure the gripper 122 can securely and appropriately grasp the target object 120. The valid orientation 604 can be utilized by the gripper 122, the robotic unit 110, the controller 112, the robotic system 100, or a combination thereof in the determination of the stable condition 526. The orientation feature 602 will be further described later.

Figure 7:
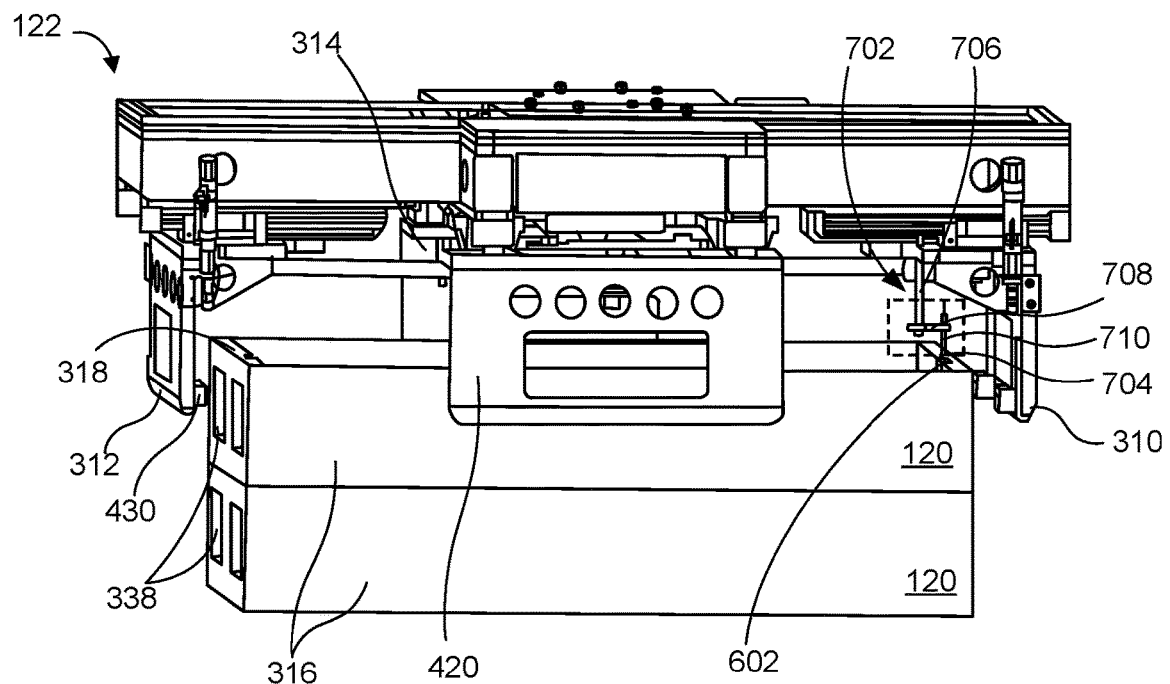
FIG. 7 is a perspective view of the gripper of FIG. 5 orienting to the target object.

Referring now to FIG. 7, therein is shown a perspective view of the gripper 122 orienting to the target object 120. The example shown in FIG. 7 can represent the gripper 122 of FIG. 5 and of the target object 120 of FIG. 5 but viewed at a different angle for the perspective view.

The view of this example depicts the gripper 122 above the target object 120 before being secured and while checking an orientation, the horizontal positioning, or horizontal rotation of the gripper 122 relative to the target object 120 or the target object 120 relative to the gripper 122. In this example, an orientation sensor 702 is shown at a side of the gripper 122 proximate to the first grasping blade 310.

The orientation sensor 702 generates an orientation reading 704 with respect to the item being checked. The orientation reading 704 provides information about the horizontal positioning or horizontal rotation for the item being checked. In this example, the gripper 122, the robotic unit 110 of FIG. 1, the controller 112 of FIG. 1, the robotic system 100 of FIG. 2, or a combination thereof can utilize the orientation reading 704 to determine whether the target object 120 is in the valid orientation 604 of FIG. 6.

Continuing with the orientation sensor 702 in this example, the orientation sensor 702 can be a device extending from the horizontal portion of the first grasping blade 310. The orientation sensor 702 can be an optical sensor, a mechanical sensor, an electrical sensor, an image sensor, or a combination thereof. In this example, the orientation sensor 702 can include an extension 706, a support 708, and a detector 710.

The extension 706 provides an attachment and a distance displacement from the horizontal portion of the first grasping blade 310. The extension 706 can provide mechanical function, electrical function, optical function, or a combination thereof. For example, the orientation sensor 702 can function as a mechanical sensor and the extension 706 can convey mechanical information, such as pressure information, as detected or measured by the detector 710 to generate the orientation reading 704. Also for example, the orientation sensor 702 can function as an optical sensor and the extension 706 can convey optical information as detected or measured by the detector 710 to generate the orientation reading 704. Further for example, the orientation sensor 702 can function as an electrical sensor and the extension 706 can convey electrical information as detected or measured by the detector 710 to generate the orientation reading 704. Yet further for example, the extension 706 can merely provide mechanical and structural support for the detector 710 and not convey information for the generation of the orientation reading 704.

The support 708 provides the transition from the extension 706 to the detector 710. Also, the support 708 is coupled to the extension 706 and the detector 710. The support 708 can provide mechanical function, electrical function, optical function, or a combination thereof. For example, the orientation sensor 702 can function as a mechanical sensor and the support 708 can convey mechanical, such as pressure information, as detected or measured by the detector 710 to generate the orientation reading 704.

Also for example, the orientation sensor 702 can function as an optical sensor and the support 708, the extension 706, or a combination thereof can convey optical information as detected or measured by the detector 710 to generate the orientation reading 704. Further for example, the orientation sensor 702 can function as an electrical sensor and the support 708 can convey electrical information as detected or measured by the detector 710 to generate the orientation reading 704. Yet further for example, the support 708 can merely provide mechanical and structural support for the detector 710 and not convey information for the generation of the orientation reading 704.

The detector 710 provides information to generate or generates the orientation reading 704. The detector 710 can measure or detect the orientation feature 602 from the target object 120 to be grasped and moved by the gripper 122. The detector 710 can provide mechanical function, electrical function, optical function, or a combination thereof.

For example, the orientation sensor 702 can function as a mechanical sensor and the detector 710 can detect or measure mechanical displacement or pressure change, or can convert to electrical information from detected or measured mechanical displacement or pressure change. Also for example, the orientation sensor 702 can function as an optical sensor and the detector 710 can detect or measure optical change or reflection. Further for example, the orientation sensor 702 can function as an electrical sensor and the detector 710 can convert detected or measured electrical characteristic or change based on the orientation feature 602.

For illustrative purposes, the gripper 122 is described with the orientation sensor 702 providing detection for generation or generation of the orientation reading 704 based on mechanical function, optical function, electrical function, or a combination thereof, although it is understood that the gripper 122 can be configured differently for the orientation sensor 702 to provide information to generate or to generate the orientation reading 704. For example, the orientation sensor 702 can function as an image capture device allowing for the gripper 122, the robotic unit 110, the controller 112, the robotic system 100, or a combination thereof to recognize the image and determine a match or mismatch based on the orientation feature 602. Also for example, the orientation sensor 702 can function as an image capture device to allow the gripper 122, the robotic unit 110, the controller 112, the robotic system 100, or a combination thereof to determine if a location adjustment is required for the gripper 122, the target object 120, or a combination thereof based on the location of the orientation feature 602 relative to the orientation sensor 702.

As an example, the vertical dimension of the extension 706 can be sized for the expected dimension to the target object 120 to be grasped by the gripper 122. Also for example, the horizontal dimension of the support 708 can be sized for the expected dimension relative to the orientation feature 602 and the target object 120 to be grasped by the gripper 122. Further for example, the vertical spacing of the detector 710 relative to the extension 706, the support 708, or a combination thereof can be sized for the expected dimension relative to the orientation feature 602 and the target object 120 to be grasped by the gripper 122.

In this example, the target object 120 is being checked for the orientation feature 602. The orientation feature 602 is shown in each of the walls 316 at the opposite sides of the target object 120. As a specific example, the orientation feature 602 is shown as a recess into the walls 316 from the object top 318. The gripper 122, the robotic unit 110, the controller 112 of FIG. 1, the robotic system 100, or a combination thereof can check on or determine the valid orientation 604 based on the gripper 122 being lowered to the range where the detector 710 can function to detect, measure, or capture the orientation feature 602.

The valid orientation 604 can be determined in a number of ways. For example, the detector 710, functioning as a mechanical device, can generate the orientation reading 704 based on the how far the gripper 122 would need to be lowered for the detector 710 to detect a mechanical change or a pressure change. The lowered displacement of the gripper 122 can be compared with the expected dimensions of the depth of the orientation feature 602. Also for example, the detector 710, functioning as an optical device, can detect whether the depth of the recess is detected compared to the location or vertical position of the gripper 122, the orientation sensor 702, the detector 710, or a combination thereof. Further for example, the detector 710 can function as an electrical sensor or an image sensor can provide the orientation reading 704 to assist in determining the valid orientation 604 as previously described.

Returning to the overall view shown in FIG. 7, the view of this example depicts the first grasping blade 310, the second grasping blade 312, the third grasping blade 314, and the fourth grasping blade 420. The first grasping blade 310 and the second grasping blade 312 are shown with the protrusions 430. One of the walls 316 facing the second grasping blade 312 is shown with the indents 338 to allow a firm, robust, and secure grasp of the target object 120.

For illustrative purposes, the gripper 122 is shown with the orientation sensor 702 closest to the first grasping blade 310, although it is understood that the gripper 122 can be configured differently. For example, the gripper 122 can be configured with the orientation sensor 702 proximate to the second grasping blade 312. Also for example, the gripper 122 can be configured with the orientation sensor 702 proximate to the second grasping blade 312 in addition to the one proximate the first grasping blade 310.

It has been discovered that the gripper 122, the robotic unit 110 of FIG. 1, the controller 112 of FIG. 1, the robotic system 100 of FIG. 1, or a combination thereof can provide improved accuracy for secure grasping of the target object 120 with minimal space requirements. The gripper 122 can include the orientation sensor 702 to obtain the orientation reading 704 regarding the target object 120. The orientation reading 704 allows for the determination of the valid orientation 604 of the target object 120 relative to the gripper 122 before the gripper 122 closes or chucks. The orientation sensor 702 is within the boundaries of the gripper 122 thereby eliminating additional and separate physical space beyond the gripper 122. Further, the orientation feature 602 of the target object 120 also resides within the physical dimensions of the target object 120 thereby eliminating the need for additional and separate space for the target object 120 and also for the orientation sensor 702 to function relative to the target object 120.

It has also been discovered that the gripper 122, the robotic unit 110, the controller 112, the robotic system 100, or a combination thereof can provide improved robustness for secure grasping of the target object 120 with minimal space requirements. The protrusions 430 shown in the second grasping blade 312, as an example, are located to align with the indents 338 along the walls 316 at the location where the second grasping blade 312 will contact when the gripper 122 closes or chucks. The fit of the protrusions 430 within the indents 338 prevents slippage or drops of the target object 120 by the gripper 122. The protrusions 430 are facing inwards with respect to the gripper 122 and require no additional physical space outside the horizontal space beyond the gripper 122.

Figure 8:
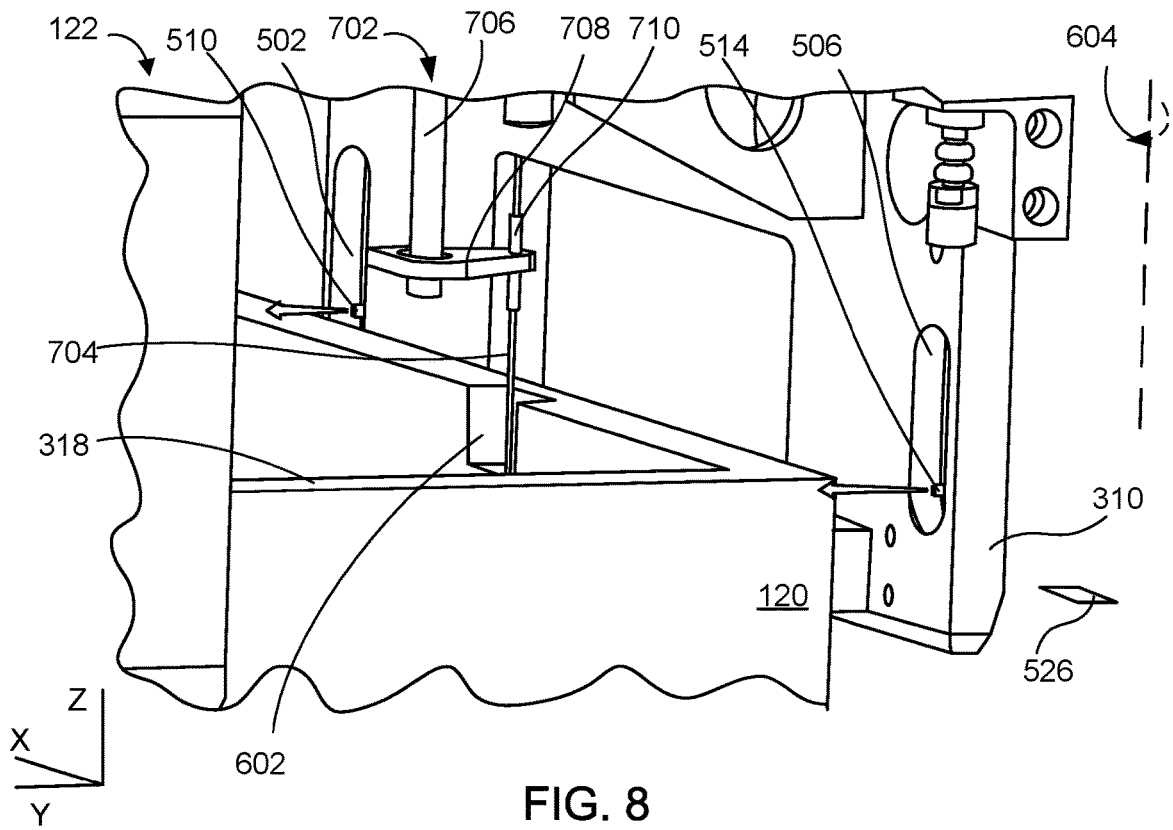
FIG. 8 is a detailed view of a portion of the gripper of FIG. 7 orienting with the target object.

Referring now to FIG. 8, therein is shown a detailed view of a portion of the gripper 122 of FIG. 7 orienting with the target object 120. In this example shown in FIG. 8, the first grasping blade 310 is shown with the first slot 502 and the third slot 506. The first position sensor 510 and the third position sensor 514 are shown within the first slot 502 and the third slot 506, respectively.

This example also depicts the orientation sensor 702 located at the side of the gripper 122 proximate to the first grasping blade 310. The orientation sensor 702 is shown with the extension 706, the support 708, and the detector 710. This example shows the detector 710 over the orientation feature 602 in one of the walls and providing the orientation reading 704 that would contribute to the determination of the valid orientation 604, the stable condition 526, or a combination thereof.

Further in this example, FIG. 8 depicts the first position sensor 510 and the third position sensor 514 about the level of the object top 318. For this example, the first position sensor 510 can generate the first position reading 518 and the third position sensor 514 can generate the third position reading 522 that would contribute to the determination of the valid orientation 604, the stable condition 526, or a combination thereof.

The checking or determination of the valid orientation 604 can be before, after, or concurrently with the vertical position verification. As an example, the first position reading 518, the second position reading 520 of FIG. 5, the third position reading 522, the fourth position reading 524 of FIG. 5, or a combination thereof can be utilized to perform the vertical position verification by the gripper 122, the robotic unit 110, the controller 112 of FIG. 1, the robotic system 100, or a combination thereof.

The term concurrent refers to multiple operations in progress before one is completed. The term concurrent does not require multiple operations to be occurring simultaneously at any instant of time.

It has been discovered that the gripper 122, the robotic unit 110 of FIG. 1, the controller 112 of FIG. 1, the robotic system 100 of FIG. 1, or a combination thereof can provide improved accuracy for secure grasping of the target object 120 with minimal space requirements. The checks for both the valid orientation 604, as a horizontal verification, and from the stable condition 526 based on the comparison of the first position reading 518, the second position reading 520 of FIG. 5, the third position reading 522, the fourth position reading 524, or a combination thereof relative to the object top provides a three dimensional verification of the readiness for the gripper 122 to grasp or chuck the target object 120. These checks are performed without requiring additional or separate physical space that is already required for the gripper 122, the target object 120, or a combination thereof.

Figure 9:
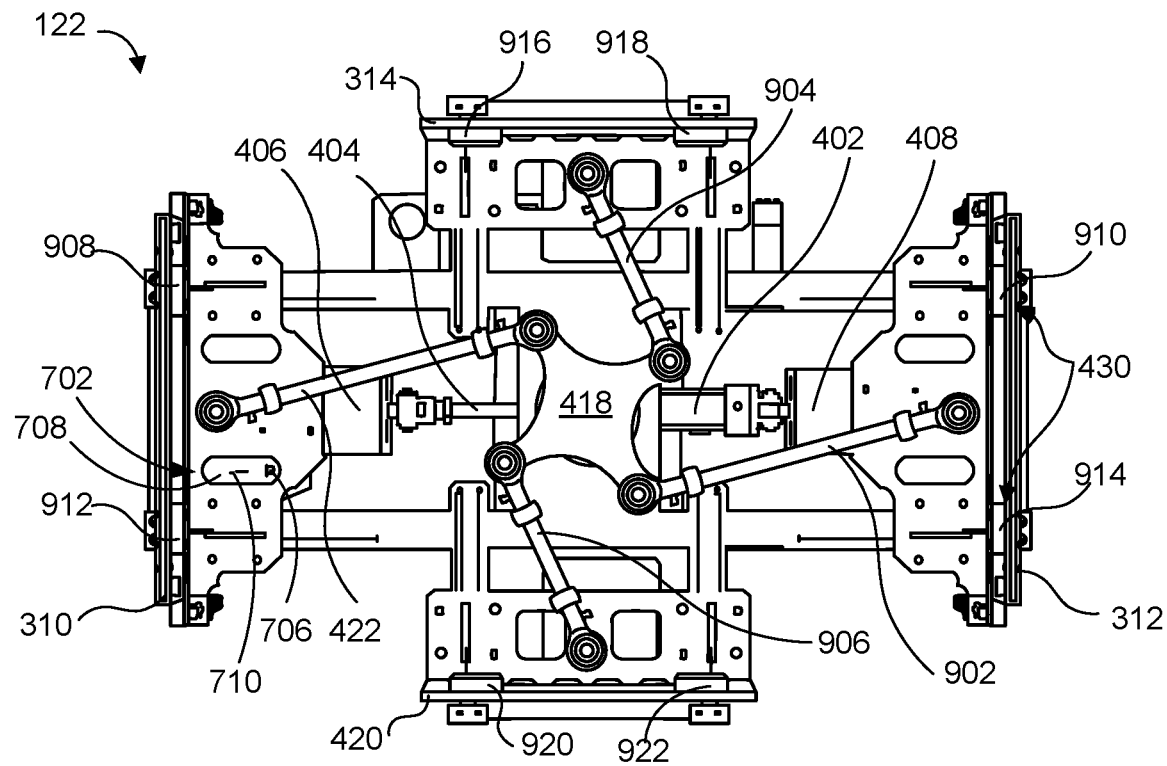
FIG. 9 is a bottom view of the gripper.

Referring now to FIG. 9, there in shown a bottom view of the gripper 122. The gripper 122 can represent the gripper 122 of FIG. 7. The example shown in FIG. 9 depicts the first grasping blade 310 connected with the displacement rod 404. The second grasping blade 312 is connected with the blade actuator 402 at the end opposite the end connected to the displacement rod 404.

In this example, the displacement rod 404 is connected to the first transfer bracket 406 of FIG. 4 and the blade actuator 402 is connected to the second transfer bracket 408 of FIG. 4. The first transfer bracket 406 connects to the first grasping blade 310 at the horizontal portion thereof. Similarly as described earlier, the second transfer bracket 408 connects to the second grasping blade 312 at the horizontal portion thereof.

The first wheel rod 422 connects the first grasping blade 310 also at the horizontal portion but at a side opposite where the first transfer bracket 406 connects. The other end of the first wheel rod 422 connects to the actuation wheel 418.

A second wheel rod 902 connects the second grasping blade 312 to the horizontal portion thereof but at a side opposite where the second transfer bracket 408 connects. The other end of the second wheel rod 902 connects to the actuation wheel 418.

The second wheel rod 902 has a similar function to the first wheel rod 422. The linear displacement by the blade actuator 402 moves the first grasping blade 310 and the second grasping blade 312. This in turn rotates the actuation wheel 418 based on the movement or displacement of the first wheel rod 422 and the second wheel rod 902. The rotation of the actuation wheel 418 displaces or moves a third wheel rod 904 and a fourth wheel rod 906. The third wheel rod 904 and the fourth wheel rod 906 have similar functions to the first wheel rod 422, the second wheel rod 902, or a combination thereof.

The other end of the third wheel rod 904 connects to the third grasping blade 314. As the actuation wheel 418 moves or displaces the third wheel rod 904, the third grasping blade 314 is also moved or displaced. The third grasping blade 314 is moved or displaced based on the displacement from the blade actuator 402.

The other end of the fourth wheel rod 906 connects to the fourth grasping blade 420. As the actuation wheel 418 moves or displaces the fourth wheel rod 906, the fourth grasping blade 420 is also moved or displaced. The fourth grasping blade 420 is moved or displaced based on the displacement from the blade actuator 402.

In this example and view, the protrusions 430 are shown from the first grasping blade 310, the second grasping blade 312, the third grasping blade 314, and the fourth grasping blade 420. The protrusions 430 can include a first protrusion 908 and a second protrusion 912 attached to or extending from the first grasping blade 310. The protrusions 430 can a third protrusion 910 and a fourth protrusion 914 attached to or extending from the second grasping blade 312.

Continuing with this example, the protrusions 430 can include a fifth protrusion 916 and a sixth protrusion 918 attached to or extending from the third grasping blade 314. The protrusions 430 can also include a seventh protrusion 920 and an eighth protrusion 922 attached to or extending from the fourth grasping blade 420.

Also shown in this example and view, the orientation sensor 702 is shown extending from the horizontal portion of the first grasping blade 310. This view depicts the extension 706, the support 708, and the detector 710.

Figure 10:
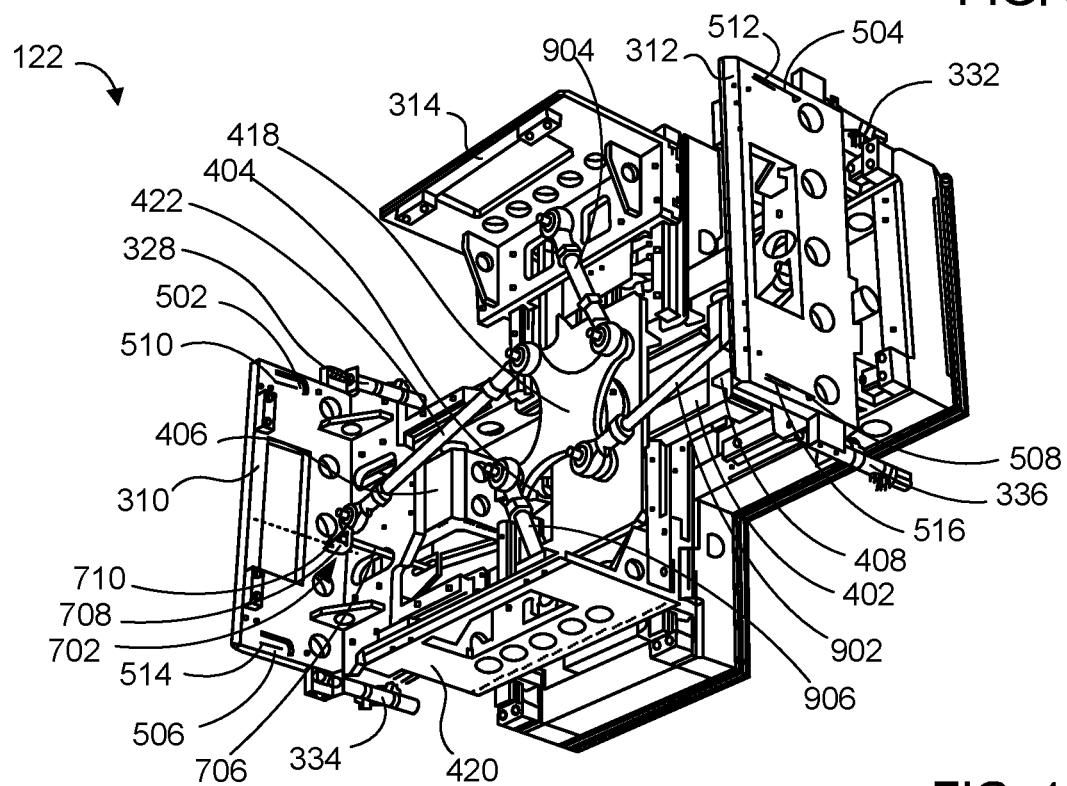
FIG. 10 is a bottom perspective view of the gripper of FIG. 9.

Referring now to FIG. 10, therein is shown a bottom perspective view of the gripper 122 of FIG. 9. This example in this view provides a depiction of the vertical elevation relationship of the various portions of the gripper 122.

As described earlier, this view also depicts the blade actuator 402, the displacement rod 404, the first transfer bracket 406, and the second transfer bracket 408. This view also depicts the first transfer bracket 406 connecting to the horizontal portion of the first grasping blade 310. Similarly, the second transfer bracket 408 is shown connecting to the horizontal portion of the second grasping blade 312.

The actuation wheel 418 connects the first wheel rod 422, the second wheel rod 902, the third wheel rod 904, and the fourth wheel rod 906 with the first grasping blade 310, the second grasping blade 312, the third grasping blade 314, and the fourth grasping blade 420, respectively.

The first grasping blade 310 is shown with the first slot 502 and the third slot 506. The first position sensor 510 and the third position sensor 514 within the first slot 502 and the third slot 506, respectively. The first actuator 328 and the third actuator 334 are also shown attached to the first grasping blade 310.

The second grasping blade 312 is shown with the second slot 504 and the fourth slot 508. The second position sensor 512 and the fourth position sensor 516 within the second slot 504 and the fourth slot 508, respectively. The second actuator 332 and the fourth actuator 336 are also shown attached to the second grasping blade 312.

The orientation sensor 702 is shown extending from a movement slot in the horizontal portion of the first grasping blade 310. The configuration of the movement slot allows for the movement for the first grasping blade 310 towards and away from the actuation wheel 418. The orientation sensor 702 includes the extension 706 through the movement slot. The view also depicts the support 708 and the detector 710.

It has been discovered that the gripper 122, the robotic unit 110 of FIG. 1, the controller 112 of FIG. 1, the robotic system 100 of FIG. 1, or a combination thereof can provide a multi-surface, multi-angled, flexible gripping mechanism with minimum space requirement. The gripper 122 include the blade actuator 402 cause a displacement of the first grasping blade 310, the second grasping blade 312, or a combination thereof. The first grasping blade 310 and the second grasping blade 312 are at opposing ends of the gripper 122. The displacement from the blade actuator 402 also moves or articulates the third grasping blade 314, the fourth grasping blade 420, or a combination thereof by transferring the movement or articulation with the actuation wheel 418 along with the first wheel rod 422, the second wheel rod 902, the third wheel rod 904, and the fourth wheel rod 906 thereby eliminating the physical space requirement for a separate actuator and corresponding attendant mechanism for the third grasping blade 314, the fourth grasping blade 420, or a combination thereof.

Figure 11:
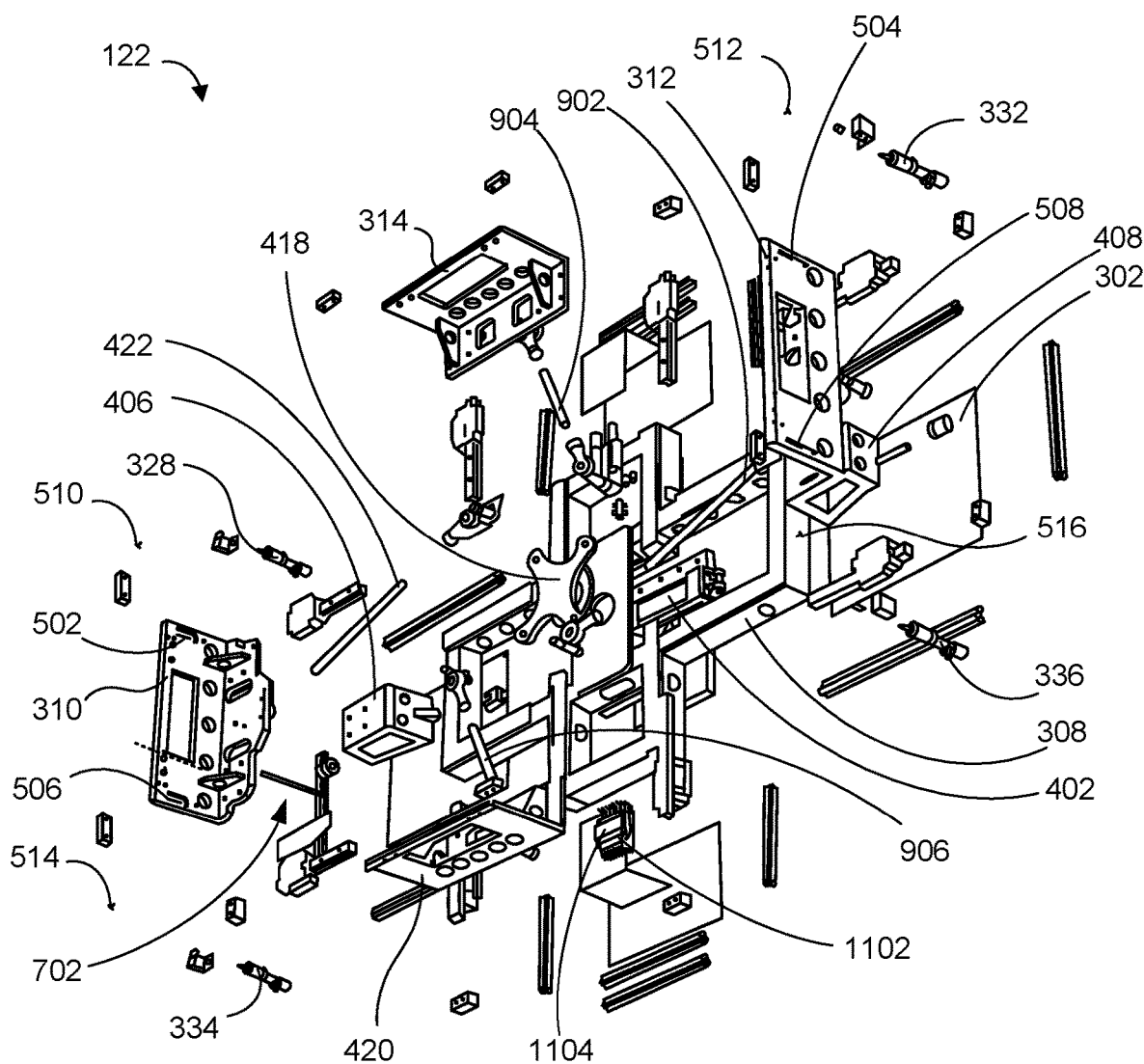
FIG. 11 is an exploded bottom perspective view of the gripper of FIG. 10.

Referring now to FIG. 11, therein is shown an exploded bottom perspective view of the gripper 122 of FIG. 10. This exploded view provides an additional view of the portions of the gripper 122. This exploded view also depicts a socket 1102 and a component 1104.

The socket 1102 allows for physical connection, mechanical connection, optical connection, electrical connection, or a combination thereof from where the socket 1102 is attached or connected to and the item, such as the component 1104, placed or mounted into the socket 1102. The socket 1102 can include a number of types of connectors. For example, the socket 1102 can be an interface for an electronic device, a mechanical connector, a mechanical and electrical connector, an optical device, or a combination thereof.

The component 1104 is an item or device that connects to the socket 1102 for physical connection, mechanical connection, optical connection, electrical connection, or a combination thereof. The component 1104 can include a number of types and functions. For example, the component 1104 can include electronic devices that provide functions as the control unit 202 of FIG. 2, the storage unit 206 of FIG. 2, the communication unit 212 of FIG. 2, or a combination thereof. Also for example, the component 1104 can also provide functions as the sensor unit 230 of FIG. 2.

In this example, the component 1104 can be mated, inserted, or connected with or into the socket 1102. The component 1104 can interface with, communicate with, or control the other portions of the gripper 122, such as the orientation sensor 702, the first position sensor 510, the second position sensor 512, the third position sensor 514, the fourth position sensor 516, the first actuator 328, the second actuator 332, the third actuator 334, and the fourth actuator 336. The component 1104 can also interface with, communicate with, or control other portions of the robotic unit 110 of FIG. 1, the robotic system 100 of FIG. 1, or a combination thereof.

As in FIG. 10, this view depicts the covers 302, the frame 308, the blade actuator 402, the first transfer bracket 406, and the second transfer bracket 408. This view also depicts the first transfer bracket 406, the second transfer bracket 408, the first grasping blade 310, the second grasping blade 312, the third grasping blade 314, and the fourth grasping blade 420. This view further depicts the actuation wheel 418, the first wheel rod 422, the second wheel rod 902, the third wheel rod 904, and the fourth wheel rod 906.

Continuing to list the portions, this view depicts the first slot 502, the second slot 504, the third slot 506, and the fourth slot 508. The view also depicts the first position sensor 510, the second position sensor 512, the third position sensor 514, and the fourth position sensor 516. The view further depicts the first actuator 328, the second actuator 332, the third actuator 334, and the fourth actuator 336.

Figure 12:
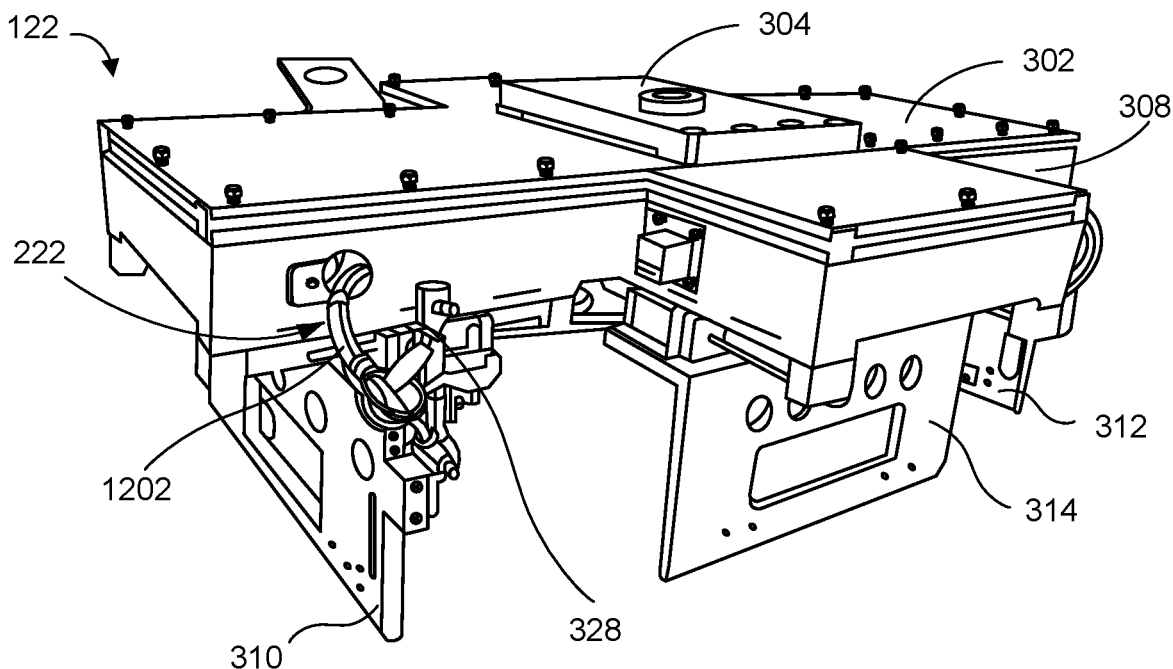
FIG. 12 is a perspective view of the gripper with the actuation interface.

Referring now to FIG. 12, therein is shown a perspective view of the gripper 122 with the actuation interface 222. The example shown in this view depicts the gripper 122 that can represent the gripper 122 in the previous figures. The view depicts the covers 302, the mounting plate 304, the frame 308, the first grasping blade 310, and the second grasping blade 312. The view can also depict the third grasping blade 314, although the view can also depict the fourth grasping blade 420 of FIG. 11 depending on the rotation or orientation of this view relative to the other figures.

For this sake of brevity and clarity, the description will proceed as the third grasping blade 314 is depicted. Further, the actuation interface 222 is described with respect to the first grasping blade 310 and the first actuator 328.

For example, the first actuator 328 can be described as a pneumatic actuator. The actuation interface 222 can include actuation lines 1202, which are shown coming out a hole in the frame 308. The actuation lines 1202 provide controls to move the first actuator 328, in this example, along the vertical axis or direction. In this view, the actuation lines 1202 are connected to the first actuator 328.

In the example where the first actuator 328 is a pneumatic actuator, the actuation lines 1202 can provide some form of gas or fluid to move the first actuator 328 along the vertical axis or direction. Some of the actuation lines 1202 can cause the first actuator 328 to engage in an upward or downward motion.

As another example, the first actuator 328 can be described as an electrical actuator. In this example, the actuation lines 1202 can provide electrical signals to cause motion of the first actuator 328.

Similar actuation lines 1202 can be connected to the second actuator 332 of FIG. 10, the third actuator 334 of FIG. 10, the fourth actuator 336 of FIG. 10, or a combination thereof. The actuation lines 1202 can provide the same controls at the same time or can operate independently to the first actuator 328, the second actuator 332, the third actuator 334, and the fourth actuator 336.

Figure 13:
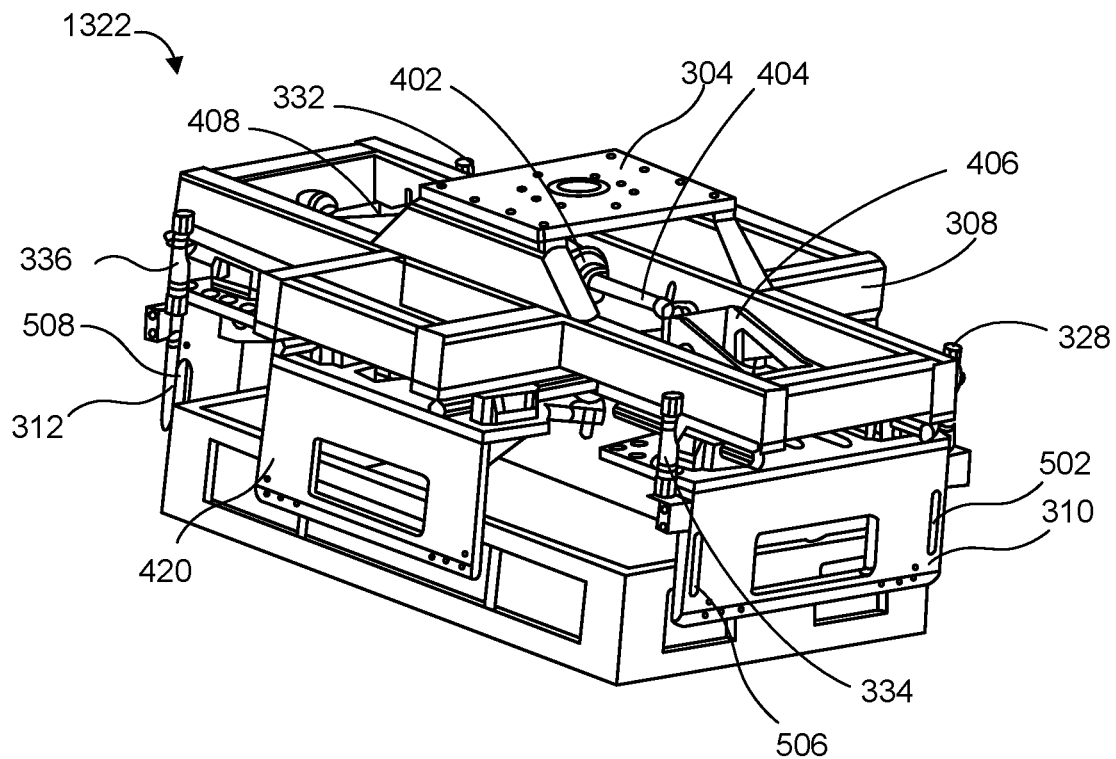
FIG. 13 is a perspective view of a gripper in a further embodiment.

Referring now to FIG. 13, therein is a perspective view of a gripper 1322 in a further embodiment. The gripper 1322 can also be utilized with the robotic unit 110 of FIG. 1, the robotic system 100 of FIG. 1, or a combination thereof as the gripper 122 of FIG. 1. For the sake of explanation and illustrative purposes, the gripper 1322 is described herein with the elements of the gripper 122. The view of FIG. 13 is shown without the covers 302 of FIG. 3. The gripper 1322 includes the mounting plate 304 elevated above the horizontal plane of where the covers 302 would have been for the configuration of the gripper 122 that includes the mounting plate 304 of FIG. 3 in a position that is closer to being planar to the covers 302. In other words, the position of the mounting plate 304 can be vertically off-set relative to the position of the mounting plate 304 illustrated in FIG. 3.

Similar to the gripper 122, the gripper 1322 can include the frame 308, the blade actuator 402, the displacement rod 404, the first transfer bracket 406, and the second transfer bracket 408. This view also depicts the first transfer bracket 406, the second transfer bracket 408, the first grasping blade 310, the second grasping blade 312, the third grasping blade 314 of FIG. 3, and the fourth grasping blade 420.

Continuing to list the portions of the gripper 1322, this view depicts the first slot 502, the third slot 506, and the fourth slot 508. The view further depicts the first actuator 328, the second actuator 332, the third actuator 334, and the fourth actuator 336.

Figure 14:
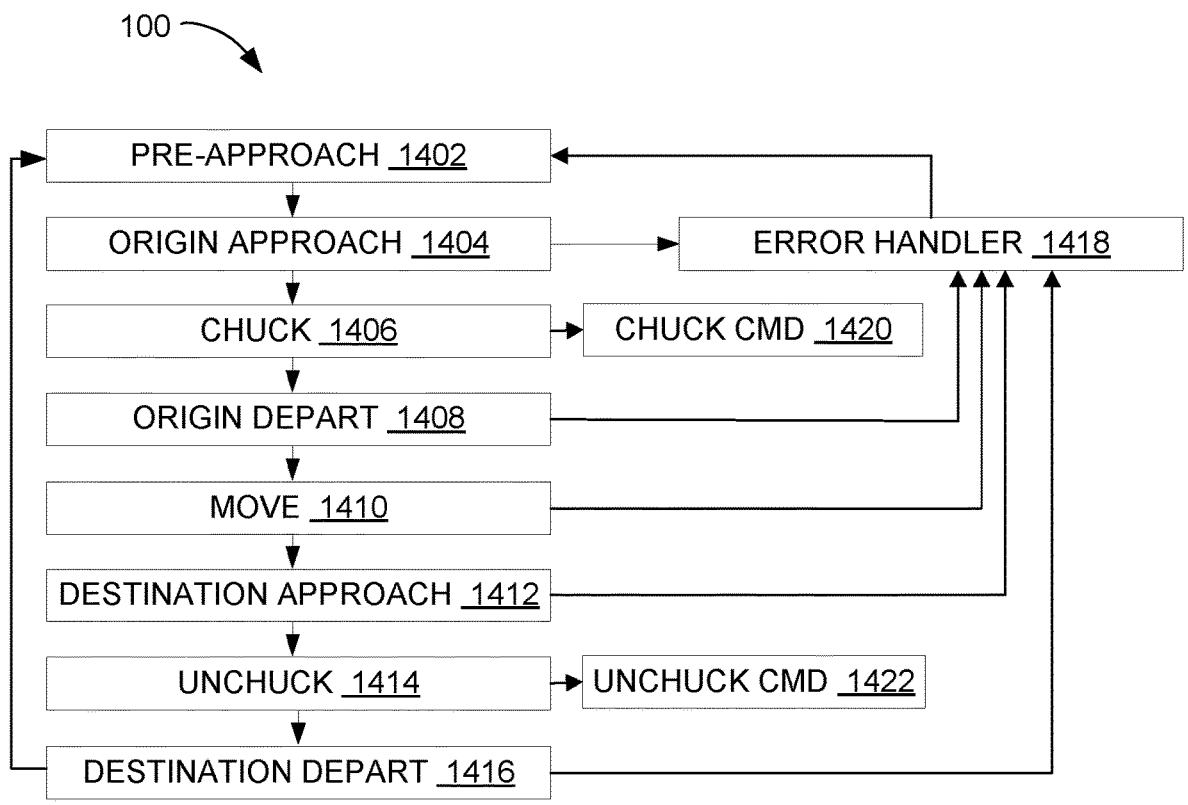
FIG. 14 is a control flow for the robotic system of FIG. 1.

Referring now to FIG. 14, therein is a control flow for the robotic system 100. The control flow can include a pre-approach module 1402, an origin approach module 1404, a chuck module 1406, an origin depart module 1408, a move module 1410, a destination approach module 1412, an unchuck module 1414, a destination depart module 1416, and an error handler module 1418.

The control flow can be implemented by the software 210 of FIG. 2 and executed by the control unit 202 of FIG. 2, the controller 112 of FIG. 2, or a combination thereof. Commands can be generated by the control unit 202, the controller 112, the component 1104 of FIG. 11, the robotic unit 110 of FIG. 1, the robotic system 100, or a combination thereof.

The software 210 can be stored in the storage unit 206 of FIG. 2. The software 210 can be also executed by the component 1104, or distributed between the component 1104 and the control unit 202. The control flow can include transmitting commands or to invoke actions utilizing the communication unit 212 of FIG. 2, the communication interface 214 of FIG. 2, the control interface 204 of FIG. 2, the storage interface 208 of FIG. 2, the actuation interface 222 of FIG. 2, the sensor interface 224 of FIG. 2, or a combination thereof as needed. The control flow can be executed by the gripper 122, the robotic unit 110 of FIG. 1, the controller 112, the robotic system 100, or a combination thereof.

The pre-approach module 1402, the origin approach module 1404, the chuck module 1406, the origin depart module 1408, the move module 1410, the destination approach module 1412, the unchuck module 1414, and the destination depart module 1416 can be coupled using wired or wireless connections, by including an output of one module as an input of the other, by including operations of one module influence operation of the other module, or a combination thereof. The portions of the control flow can be directly coupled without intervening structures or objects other than the connector there-between, or indirectly coupled to one another.

The pre-approach module 1402 can perform the initial configuration settings and checks. For example, the pre-approach module 1402 can include the selection of the first grasping blade 310 of FIG. 10, the second grasping blade 312 of FIG. 10, the third grasping blade 314 of FIG. 10, the fourth grasping blade 420 of FIG. 10, or a combination thereof can be selected for the target object 120 of FIG. 3 based on the protrusions 430 of FIG. 4 matching the locations of the indents 338 of FIG. 3.

Also, the pre-approach module 1402 can adjust the placement, where the adjustment can be made, of the first position sensor 510 of FIG. 10, the second position sensor 512 of FIG. 10, the third position sensor 514 of FIG. 10, the fourth position sensor 516 of FIG. 10, or a combination thereof to ensure that the protrusions 430 are located facing the indents 338 for firm and secure grasp of the target object 120. For example, the pre-approach module 1402 can adjust placement or the location of the position sensors to ensure that the protrusions 430 can engage with the indents 338 when the gripper 122 closes or chucks.

In the example where the position sensors can be adjusted automatically, the pre-approach module 1402 can optionally adjust the configuration of the first actuator 328 of FIG. 10, the second actuator 332 of FIG. 10, the third actuator 334 of FIG. 10, the fourth actuator 336 of FIG. 10, or a combination thereof to position or place the first position sensor 510, the second position sensor 512, the third position sensor 514, the fourth position sensor 516, or a combination thereof to ensure that the protrusions 430 are located facing the indents 338 for firm and secure grasp of the target object 120.

Further, the pre-approach module 1402 can allow for a pre-selection or adjust the ratio of dimensions between the first wheel rod 422 of FIG. 10, the second wheel rod 902 of FIG. 10, the third wheel rod 904 of FIG. 10, the fourth wheel rod 906 of FIG. 10, or a combination thereof for the dimensions of the target object 120. Yet further, the pre-approach module 1402 can allow for the pre-selection of orientation sensor 702 or adjust the position of the orientation sensor 702 for the functions of detecting the orientation feature 602 of FIG. 7 including the pre-selection or adjustment of the extension 706 of FIG. 7, the support 708 of FIG. 7, the detector 710 of FIG. 7, or a combination thereof.

Yet further, the pre-approach module 1402 can adjust the first blade limiter 410 of FIG. 4, the second blade limiter 414 of FIG. 4, or a combination thereof to limit the dimension of the open position of the gripper 122. The pre-approach module 1402 can also perform checks on the controls for the blade actuator 402 of FIG. 4, the first actuator 328, the second actuator 332, the third actuator 334, the fourth actuator 336, or a combination thereof. For example, if the aforementioned actuators are pneumatic actuators, the pre-approach module 1402 can check gas or fluid pressure to see if the main pressure is insufficient for operation. The pre-approach module 1402 can also check the function and connection of the component 1104 of FIG. 11 and the socket 1102 of FIG. 11.

The pre-approach module 1402 can further check if the target object 120 is in place before continuing the control flow. For example, the pre-approach module 1402 can check for the target object 120 with cameras (not shown) external to the gripper 122. The cameras can be included with the robotic unit 110, the transfer unit 104 of FIG. 1, elsewhere in the robotic system 100, or a combination thereof.

Once the configuration is set and the checks pass, the control flow can continue to the origin approach module 1404. The origin approach module 1404 performs one or more checks to determine whether the target object 120 can be securely grasped by the gripper 122.

For the origin approach module 1404, as the gripper 122 approaches the target object 120, the orientation sensor 702 of FIG. 8 generates the orientation reading 704 of FIG. 7 based on the orientation feature 602 of FIG. 8 along at least one of the walls 316 of FIG. 8. When the valid orientation 604 of FIG. 6 cannot be determined or reached based on the orientation reading 704, movement or position adjustment of the gripper 122 can continue until the orientation reading 704 can lead to the determination of the valid orientation 604.

After a predetermined number of tries or after a limit has been reached, the origin approach module 1404, the gripper 122, the robotic unit 110, the controller 112, the robotic system 100, or a combination thereof can signal an error, in which case the control flow can progress to the error handler module 1418.

When the valid orientation 604 is determined, the control flow can progress to the chuck module 1406. The chuck module 1406 checks the level of the gripper 122 before grasping at least one of the target object 120. The chuck module 1406 also can secure the target object 120 based on the successful checks.

The chuck module 1406 continues to check if the gripper 122 and the target object 120 are in correct position relative to each other for secure and robust grasping. The chuck module 1406 can send a chuck command 1420 to invoke the gripper 122 to securely grasp the target object 120 based on the stable condition 526 of FIG. 5.

The chuck module 1406 continues the check the vertical alignment or the vertical readiness between the gripper 122 and the target object 120 for the determination of the stable condition 526. As an example, the chuck module 1406 can operate the first position sensor 510, the second position sensor 512, the third position sensor 514, the fourth position sensor 516, or a combination thereof to generate the first position reading 518 of FIG. 5, the second position reading 520 of FIG. 5, the third position reading 522 of FIG. 5, the fourth position reading 524 of FIG. 5, or a combination thereof, respectively. The chuck module 1406 can receive the first position reading 518, the second position reading 520, the third position reading 522, the fourth position reading 524, or a combination thereof to determine if the gripper 122 has been lowered to a level for the protrusions 430 to face the indents 338, if any, of the target object 120, such that closing or chucking the gripper 122 would cause the protrusions 430 to engage within the indents 338.

The chuck module 1406 can determine the gripper 122 is ready to grasp the target object 120 when the first position reading 518, the second position reading 520, the third position reading 522, the fourth position reading 524, or a combination thereof is at or below the object top 318 of FIG. 5. When this condition is met, the chuck module 1406 utilize this condition along with the valid orientation 604 to determine or indicate the stable condition 526 for the gripper 122 to secure the target object 120.

Returning to the chuck command 1420, the chuck command 1420 invokes the gripper 122 to secure and grasp the target object 120. The gripper 122 secures the target object 120 along the verticals sides of the walls 316, along the object top 318 of the walls 316, or a combination thereof.

Continuing with the example, the chuck module 1406 can secure the vertical sides of the walls 316 by operating the blade actuator 402 of FIG. 4. The blade actuator 402 can move the first grasping blade 310, the second grasping blade 312, the third grasping blade 314, the fourth grasping blade 420, or a combination thereof to secure the target object 120.

Further continuing the example, the chuck module 1406 can also secure the object top 318 of the walls 316. The chuck module 1406 can invoke the first actuator 328, the second actuator 332, the third actuator 334, the fourth actuator 336, or a combination thereof to press down on the target object 120. For example, the first actuator 328, the second actuator 332, the third actuator 334, the fourth actuator 336, or a combination thereof can include functions of a piston pressing down on the target object 120 to further secure the target object 120.

For illustrative purposes, the gripper 122 is described to secure the target object 120 from the sides and the top in a sequential manner, although it is understood that the gripper 122 can be configured and be operated differently. For example, the gripper 122 can respond to the chuck command 1420 to secure the target object 120 by concurrently operating the blade actuator 402 along with the first actuator 328, the second actuator 332, the third actuator 334, the fourth actuator 336, or a combination thereof. Also for example, the gripper 122 can respond to the chuck command 1420 to secure the target object 120 by operating the blade actuator 402 after securing the target object 120 by operating the first actuator 328, the second actuator 332, the third actuator 334, the fourth actuator 336, or a combination thereof.

When the linear displacement of the blade actuator 402 is held in place and optionally operating the first actuator 328, the second actuator 332, the third actuator 334, the fourth actuator 336, or a combination thereof to secure the target object 120, the control flow can progress to the origin depart module 1408. The origin depart module 1408 is for the movement of the target object 120 secured by the gripper 122. The movement can be performed by the robotic unit 110 or another part of the robotic system 100.

For example, the origin depart module 1408 can continue to check the status of the blade actuator 402, the stable condition 526, or a combination thereof. As a specific example, the origin depart module 1408 can optionally check for slippage of the target object 120 being grasped by the gripper 122 by monitoring the first position reading 518, the second position reading 520, the third position reading 522, the fourth position reading 524, or a combination thereof. For example, the origin departure module 1408 can determine slippage of the target object 120 as a change or shift in position of the target object 120 based on changes in the first position reading 518, the second position reading 520, the third position reading 522, the fourth position reading 524, or a combination thereof following securing of the target object 120 by the gripper 112.

Further, the origin depart module 1408 can continue to check whether the first actuator 328, the second actuator 332, the third actuator 334, the fourth actuator 336, or a combination thereof is pressing on the target object 120. As a specific example, the origin depart module 1408 can check the pressure from the first actuator 328, the second actuator 332, the third actuator 334, the fourth actuator 336, or a combination thereof on the target object 120. Also for example, the origin depart module 1408 can check the status through the actuation interface 222 of FIG. 2 and, as a specific example, check the pressure of the actuation lines 1202 of FIG. 12.

When the stable condition 526 is not maintained, the control flow can progress to the error handler module 1418. When the stable condition 526 is maintained, the control flow can progress to the move module 1410. The move module 1410 picks up at least one of the target object 120 being grasped and secured by the gripper 122. The move module 1410 can also locate the gripper 122 to a destination location.

Similarly, the move module 1410 can optionally continue to check the status of the blade actuator 402, the stable condition 526, or a combination thereof. As a specific example, the move module 1410 can optionally check for slippage of the target object 120 being grasped by the gripper 122 by monitoring the first position reading 518, the second position reading 520, the third position reading 522, the fourth position reading 524, or a combination thereof. For example, the move module 1410 can determine slippage of the target object 120 as a change or shift in position of the target object 120 based on changes in the first position reading 518, the second position reading 520, the third position reading 522, the fourth position reading 524, or a combination thereof following securing of the target object 120 by the gripper 112.

Further, the move module 1410 can continue to check whether the first actuator 328, the second actuator 332, the third actuator 334, the fourth actuator 336, or a combination thereof is pressing on the target object 120. As a specific example, the move module 1410 can check the pressure from the first actuator 328, the second actuator 332, the third actuator 334, the fourth actuator 336, or a combination thereof on the target object 120. Also for example, the move module 1410 can check the status through the actuation interface 222 and, as a specific example, check the pressure of the actuation lines 1202 of FIG. 12.

When the stable condition 526 is not maintained, the control flow can progress to the error handler module 1418. When the stable condition 526 is maintained, the control flow can progress to the destination approach module 1412. The destination approach module 1412 can optionally check to determine whether the target object 120 that is secured by the gripper 122 can be placed at the destination location. The destination approach module 1412 can also generate or execute instructions for beginning release or un-securing of the target object 120.

The destination approach module 1412 can perform the checks in a number of ways. For example, if the target object 120 secured by the gripper 122 is being stacked on another of the target object 120, then the destination approach module 1412 can locate the stack and the appropriate orientation for stacking the target object 120. This stacking check can be performed utilizing one or more cameras external to the gripper 122. As a different example, the destination approach module 1412 can check if the destination location has space for the target object 120 to be placed.

Continuing with the destination approach module 1412, the destination approach module 1412 can be for placing the target object 120 secured by the gripper 122 at the destination location. The destination approach module 1412 can optionally check whether the target object 120 moved to or placed at the destination location is placed at a proper angle, such as flat on a pallet.

The destination approach module 1412 can check the angle of the target object 120 in a number of ways. For example, the destination approach module 1412 can check the actuation interface 222 or, as a specific example, check for pressure changes to the actuation lines 1202 to indicate whether the target object 120 is in the proper angle, e.g. flat. Also for example, the destination approach module 1412 can check the first position reading 518, the second position reading 520, the third position reading 522, the fourth position reading 524, or a combination thereof relative to the object top 318 to determine whether one or more of the position sensors indicates that the target object 120 is no longer in the stable condition 526. Further for example, the destination approach module 1412 can perform a check of the placement angle of the target object 120 based on information received from cameras external to the gripper 122.

The destination approach module 1412 can also be for generating or executing instructions to initiate unsecuring of the target object 120 being grasped or secured by the gripper 122. For example, once the angle of the target object 120 at the destination location is determined to be satisfactory, such in the stable condition 526, the gripper 122 can release the pressure on the target object 120. As a specific example, the destination approach module 1412 can generate or execute instructions for operating operate the first actuator 328, the second actuator 332, the third actuator 334, the fourth actuator 336, or a combination thereof to cease pressing on target object 120. As a more specific example, the destination approach module 1412 can generate or execute instructions for operating or operate the first actuator 328, the second actuator 332, the third actuator 334, the fourth actuator 336, or a combination thereof to move upwards to stop pressing on the target object 120.

When the stable condition 526 is not maintained or the other checks that were performed were not satisfied, the control flow can progress to the error handler module 1418. When the stable condition 526 is maintained and the other checks that were performed are satisfied, the control flow can progress to the unchuck module 1414. As an example, during implementation of the unchuck module 1414, the robotic system 100 can complete release or unsecure the target object 120 grasped or secured by the gripper 122.

The unchuck module 1414 is for generating or executing an unchuck command 1422 to complete release or unsecuring of the target object 120 by the gripper 122. The unchuck command 1422 invokes the gripper 122 to continue the release or unsecure function.

As an example, the gripper 122 can complete the release and unsecuring function by allowing the blade actuator 402 to cease displacing the first grasping blade 310 of FIG. 10, the second grasping blade 312 of FIG. 10, the third grasping blade 314 of FIG. 10, the fourth grasping blade 420 of FIG. 10, or a combination thereof towards the walls 316 of the target object 120. As a specific example, the blade actuator 402 can release the pressure exerted by the first grasping blade 310, the second grasping blade 312, the third grasping blade 314, the fourth grasping blade 420, or a combination thereof and move towards the frame 308 of FIG. 3, which can be limited by the first blade limiter 410 of FIG. 4, the second blade limiter 414 of FIG. 4, or a combination thereof.

The control flow can progress to the destination depart module 1416. The destination depart module 1416 is for moving the gripper 122 away from the target object 120. The destination depart module 1416 can also check the target object 120 as the gripper 122 moves away from the target object 120.

As an example, the destination depart module 1416 can generate or execute instruction to move the gripper 122 away from the target object 120 after releasing and unsecuring. As the destination depart module 1416 lifts the gripper 122, the gripper 122 checks the relative angle of the target object 120 at the destination location. As a specific example, the destination depart module 1416 can utilize the first position reading 518, the second position reading 520, the third position reading 522, the fourth position reading 524, or a combination thereof to check if the aforementioned reading indicates what is expected for the angle, such as the same angle as the surface where the target object 120 has been placed, of the target object 120 as the gripper 122 moves away from the target object 120.

When the angle is not as expected as the gripper 122 moves away, the control flow can progress to the error handler module 1418. When the angle is as expected as the gripper 122 moves away, the control flow can return to the pre-approach module 1402 or the control flow can end.

The error handler module 1418 allows for corrective actions within the control flow or to notify other portions of the robotic unit 110, the controller 112, the robotic system 100, or a combination thereof. The function of and flow from the error handler module 1418 can depend on what portion of the control flow led to the error handler module 1418.

When the origin approach module 1404 flows to the error handler module 1418, other portions of the robotic system 100 can be invoked to correct the orientation of the target object 120. The control flow can remain with the error handler module 1418 until a reset occurs with the control flow or can return to the pre-approach module 1402 to restart the operations of the control flow. The reset condition would put the control flow into an initial state as in first power on state of the robotic system 100. Also, the error handler module 1418 can terminate the operation of the control flow if an error cannot be resolved by the robotic system 100.

When the origin depart module 1408 flows to the error handler module 1418, some corrective actions can be taken by the error handler module 1418. For example, the error handler module 1418 can increase the force from the blade actuator 402 if slippage is detected. If the increased force is successful to prevent or stop the slippage, the control flow can return to the origin depart module 1408. Also for example, if the first actuator 328, the second actuator 332, the third actuator 334, the fourth actuator 336, or a combination thereof is not pressing down on the target object 120 sufficiently, then the error handler module 1418 can increase the pressing force of the appropriate actuator through the actuation interface 222. If the error handler module 1418 is successful in preventing or stopping the slippage, the control flow can return to the origin depart module 1408. If the error handler module 1418 cannot successfully implement a corrective action, then the control flow can remain with the error handler module 1418 until the approach reset occurs with the control flow or can return to the pre-approach module 1402.

When the move module 1410 flows to the error handler module 1418, the error handler module 1418 can attempt to transport the target object 120 to a predesignated location for an emergency or stop moving the target object 120. The control flow can remain with the error handler module 1418 until the approach reset occurs with the control flow or can return to the pre-approach module 1402.

When the destination approach module 1412 flows to the error handler module 1418, the error handler module 1418 can attempt corrective actions. For example, the error handler module 1418 can attempt to relocate the target object 120 such that the proper angle can be achieved. Also for example, the error handler module 1418 can also adjust the pressure to the first actuator 328, the second actuator 332, the third actuator 334, the fourth actuator 336, or a combination thereof as needed. If successful in relocating the target object 120, then the control flow can return to the destination approach module 1412. If not successful in relocating the target object 120, then the control flow can remain with the error handler module 1418 until the approach reset occurs with the control flow or can return to the pre-approach module 1402.

When the destination depart module 1416 flows to the error handler module 1418, the error handler module 1418 can attempt corrective actions. For example, the error handler module 1418 can attempt to relocate the target object 120 such that the proper angle can be achieved. Also for example, the error handler module 1418 can also generate or execute instructions for operating the gripper 122 to secure the target object 120 to move to a more suitable location. If successful, then the control flow can return to the destination depart module 1416. If not successful, then the control flow can remain with the error handler module 1418 until the approach reset occurs with the control flow or can return to the pre-approach module 1402.

For illustrative purposes, the control flow is described in FIG. 14 with the partition of modules and the functions for each of the modules, although it is understood that control flow can operate and be configured differently. For example, generation or execution of instructions for operating the first actuator 328, the second actuator 332, the third actuator 334, the fourth actuator 336, or a combination thereof can be performed by the origin depart module 1408 instead of the chuck module 1406. Also for example, the functions of the chuck module 1406 and the origin depart module 1408 can be included into a single module. Further for example, the corrective actions described in the error handler module 1418 can perform in the respective module that flowed into the error handler module 1418.

Figure 15:
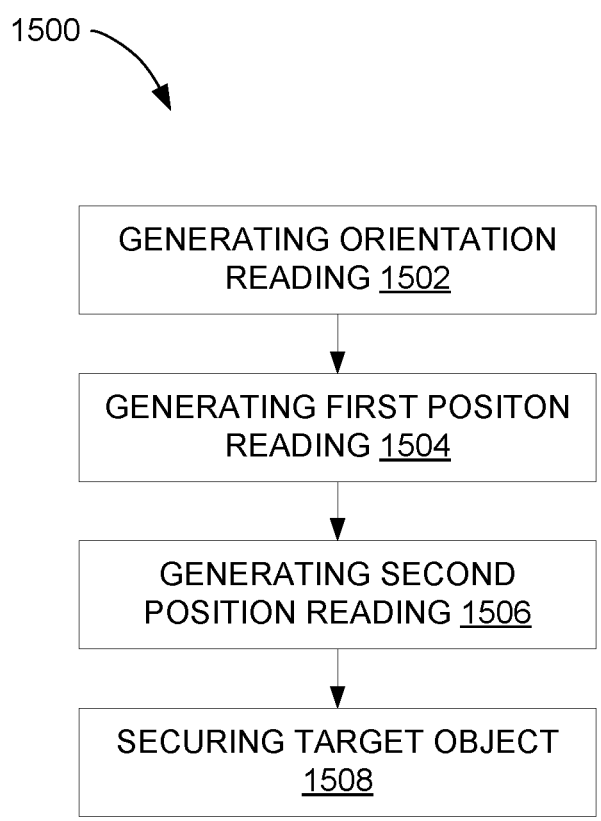
FIG. 15 is flow chart of a method of operation of a robotic system in an embodiment of the present invention.

Referring now to FIG. 15, therein is shown a flow chart of a method 1500 of operation of a robotic system 100 including the gripper 122 of FIG. 1 in an embodiment of the present invention. The method 1500 includes generating an orientation reading for a target object in a block 1502; generating a first position reading representing a position of a first grasping blade of the gripper relative to the target object in a block 1504; generating a second position reading representing a position of a second grasping blade of the gripper relative to the target object and the second grasping blade located at an opposite side of the target object as the first grasping blade in a block 1506; and executing an instruction for securing the target object with the first grasping blade and the second grasping blade based on a valid orientation reading of the orientation reading and based on the first position reading and the second position reading indicating a stable condition in a block 1508.

The resulting method, process, apparatus, device, product, and/or system is cost-effective, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A gripper comprising:
an orientation sensor configured to generate an orientation reading for an orientation feature as a recess into the walls from an object top of a target object, the orientation sensor includes a support coupled to a detector to detect the orientation feature and determine if a location adjustment is required;
a first grasping blade, including a horizontal portion to connect the orientation sensor, configured to secure the target object;
a second grasping blade configured to secure the target object in conjunction with the first grasping blade and at an opposite end of the target object relative to the first grasping blade;
a first position sensor configured to generate a first position reading of the first grasping blade relative to the target object and located with the first grasping blade;
a second position sensor configured to generate a second position reading of the second grasping blade relative to the target object and located with the second grasping blade; and
a blade actuator configured to secure the target object with the first grasping blade and the second grasping blade based on a valid orientation of the orientation reading and based on the first position reading and the second position reading indicating the first grasping blade and the second grasping blade in a position to grasp the target object, and the target object coupled to the first grasping blade and the second grasping blade includes a protrusion of the first grasping blade located to fit into an indent in a wall of the target object.

2. The gripper as claimed in claim 1 wherein:
the first position sensor is further configured to generate the first position reading with a first blade bottom of the first grasping blade below an object top of the target object; and
the second position sensor is further configured to generate the second position reading with a second blade bottom of the second grasping blade below the object top.

3. The gripper as claimed in claim 1 further comprising:
a third position sensor, located with the first grasping blade, configured to generate a third position reading of the first grasping blade relative to the target object;
a fourth position sensor, located with the second grasping blade, configured to generate a fourth position reading of the second grasping blade relative to the target object; and
wherein the blade actuator is further configured to:
secure the target object based on the first position reading, the second position reading, the third position reading, and the fourth position reading indicating the first grasping blade and the second grasping blade in a position to grasp the target object.

4. The gripper as claimed in claim 1 wherein:
the first position sensor is further configured to generate the first position reading with a first blade bottom of the first grasping blade below an object top of the target object; and
the second position sensor is further configured to generate the second position reading with a second blade bottom of the second grasping blade below the object top, wherein the second position reading is the same as the first position reading.

5. The gripper as claimed in claim 1 wherein:
the blade actuator is further configured to unsecure the target object;
the first position sensor is further configured to generate the first position reading at an object top of the target object; and
the second position sensor is further configured to generate the second position reading at the object top.

6. The gripper as claimed in claim 1 further comprising:
a first actuator, coupled to the first position sensor, configured to secure the target object with the first grasping blade; and
a second actuator, coupled to the second position sensor, configured to secure the target object with the second grasping blade.

7. The gripper as claimed in claim 1 further comprising:
an actuation wheel, coupled to the first grasping blade, configured to displace of the first grasping blade;
a third grasping blade, coupled to the actuation wheel, configured to secure the target object based on the displacement; and
a fourth grasping blade, coupled to the actuation wheel and at an opposite end to the third grasping blade, configured to secure the target object based on the displacement.

8. A method of operation of a robotic system including a gripper comprising:
generating an orientation reading for an orientation feature as a recess into the walls from an object top of a target object, the orientation sensor includes a support coupled to a detector to detect the orientation feature and determine if a location adjustment is required;
generating a first position reading representing a position of a first grasping blade of the gripper relative to the target object;
generating a second position reading representing a position of a second grasping blade of the gripper relative to the target object and the second grasping blade located at an opposite side of the target object as the first grasping blade, and
executing an instruction for securing the target object with the first grasping blade and the second grasping blade based on a valid orientation reading of the orientation reading and based on the first position reading and the second position reading indicating the first grasping blade and the second grasping blade in a position to grasp the target object including fitting a protrusion of the first grasping blade into an indent in a wall of the target object.

9. The method as claimed in claim 8 wherein:
generating the first position reading representing a first blade bottom of the first grasping blade below an object top of the target object; and
generating the second position reading representing a second blade bottom of the second grasping blade below the object top.

10. The method as claimed in claim 8 wherein:
generating a third position reading representing a position of the first grasping blade relative to the target object;
generating a fourth position reading representing a position of the second grasping blade relative to the target object; and
executing an instruction for securing the target object is based on the first position reading, the second position reading, the third position reading, and the fourth position reading indicating the first grasping blade and the second grasping blade in a position to grasp the target object.

11. The method as claimed in claim 8 wherein:
generating the first position reading represents a first blade bottom of the first grasping blade below an object top of the target object; and
generating the second position reading represents a second blade bottom of the second grasping blade below the object top, wherein the second position reading is the same as the first position reading.

12. The method as claimed in claim 8 further comprising:
executing an instruction for unsecuring the target object;
generating the first position reading for locating an object top of the target object; and
generating the second position reading for locating the object top.

13. The method as claimed in claim 8 further comprising:
executing an instruction for securing the target object with the first grasping blade; and
executing an instruction for securing the target object with the second grasping blade.

14. The method as claimed in claim 8 further comprising:
executing an instruction for displacing of the first grasping blade with an actuation wheel;
executing an instruction for securing the target object based on displacing a third grasping blade coupled to the actuation wheel; and
executing an instruction for securing the target object based on displacing a fourth grasping blade coupled to the actuation wheel.

15. A robotic system comprising:
a control unit configured to:
verify a valid orientation for an orientation feature as a recess into the walls from an object top of a target object, the orientation sensor includes a support coupled to a detector to detect the orientation feature and determine if a location adjustment is required,
determine a first grasping blade and a second grasping blade in a position to grasp the target object for the target object based on a first position reading of a first grasping blade of a gripper relative to the target object and a second position reading of a second grasping blade of the gripper relative to the target object,
generate a chuck command based on the first grasping blade and the second grasping blade in a position to grasp the target object and the valid orientation for the target object; and
a communication unit, coupled to the control unit, configured to:
transmit the chuck command for securing the target object with the first grasping blade and the second grasping blade includes a protrusion of the first grasping blade fitted into an indent in a wall of the target object.

16. The system as claimed in claim 15 wherein the control unit is further configured to operate a first actuator to secure the target object with the first grasping blade.

17. The system as claimed in claim 15 wherein the control unit is further configured to determine the first grasping blade and the second grasping blade in a position to grasp the target object based on the first position reading indicating a first blade bottom of the first grasping blade is below an object top of the target object.

18. The system as claimed in claim 15 wherein the control unit is further configured to determine the first grasping blade and the second grasping blade in a position to grasp the target object based on the first position reading and the second position reading at opposite ends of the target object.

19. The system as claimed in claim 15 wherein the control unit is further configured to:
generate a unchuck command to release the target object; and
determine the first grasping blade and the second grasping blade in a position to release the target object execution of after the unchuck command based on the first position reading and the second position reading are at an object top of the target object.

20. The system as claimed in claim 15 wherein the communication unit is further configured to transmit the chuck command to secure the target object with a third grasping blade of the gripper and a fourth grasping blade of the gripper, at an opposite end of the target object to the third grasping blade, based on displacing the first grasping blade and the second grasping blade.

\* \* \* \* \*